(12) United States Patent
Zhao et al.

(10) Patent No.: US 12,481,137 B2
(45) Date of Patent: Nov. 25, 2025

(54) OPTICAL SYSTEM, IMAGE PROJECTION APPARATUS, AND IMAGING APPARATUS

(71) Applicant: Panasonic Intellectual Property Management Co., Ltd., Osaka (JP)

(72) Inventors: Qinghua Zhao, Miyagi (JP); Katsu Yamada, Osaka (JP); Takuya Imaoka, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 303 days.

(21) Appl. No.: 18/232,936

(22) Filed: Aug. 11, 2023

(65) Prior Publication Data

US 2023/0384571 A1 Nov. 30, 2023

Related U.S. Application Data

(63) Continuation of application No. PCT/JP2021/029380, filed on Aug. 6, 2021.

(30) Foreign Application Priority Data

Feb. 16, 2021 (JP) ................ 2021-022596

(51) Int. Cl.
G02B 15/14 (2006.01)
G02B 13/00 (2006.01)
G02B 13/16 (2006.01)

(52) U.S. Cl.
CPC ..... G02B 15/1461 (2019.08); G02B 13/0095 (2013.01); G02B 13/16 (2013.01)

(58) Field of Classification Search
CPC .................................................. G02B 15/20
See application file for complete search history.

(56) References Cited

U.S. PATENT DOCUMENTS 7,616,384 B2 * 11/2009 Atsuumi ............ G02B 15/1461
359/683
2009/0073572 A1 * 3/2009 Atsuumi ............ G02B 15/1461
359/672

(Continued)

FOREIGN PATENT DOCUMENTS

JP 2019-174633 10/2019
JP 6685866 4/2020

OTHER PUBLICATIONS

Notice of Reasons for Refusal issued Jun. 24, 2025 in Japanese Patent Application No. 2023-500514, with English-language translation.

(Continued)

Primary Examiner — Robert E. Tallman
(74) Attorney, Agent, or Firm — Wenderoth, Lind & Ponack, L.L.P.

(57) ABSTRACT

The present disclosure is directed to an optical system internally having an intermediate imaging position that is conjugate with both of a magnification conjugate point on a magnification side and a reduction conjugate point on reduction side, including: a magnification optical system including a plurality of lens elements and positioned on the magnification side with respect to the intermediate imaging position; and a relay optical system including a plurality of lens elements and positioned on the reduction side with respect to the intermediate imaging position, wherein the relay optical system includes a plurality of moving lens groups which are independently movable in an optical axis direction during zooming, and wherein the reduction side-closest moving lens group that is positioned closest to the reduction side among the plurality of moving lens groups has a negative refractive power.

15 Claims, 26 Drawing Sheets

(56) References Cited

U.S. PATENT DOCUMENTS

2015/0226974 A1* 8/2015 Horiuchi .............. H04N 13/356
                                                           348/56
2018/0059392 A1    3/2018 Amano et al.
2019/0306390 A1* 10/2019 Nagatoshi ............ G03B 21/142
2021/0033831 A1*  2/2021 Kurokawa ..... G02B 15/143105

OTHER PUBLICATIONS

Extended European Search Report issued Jul. 26, 2024 in corresponding European Patent Application No. 21926663.2.
English translation of International Preliminary Report on Patentability issued Aug. 31, 2023 in International Application No. PCT/JP2021/029380.
International Search Report issued in International Application No. PCT/JP2021/029380 on Oct. 19, 2021, with English translation.

* cited by examiner

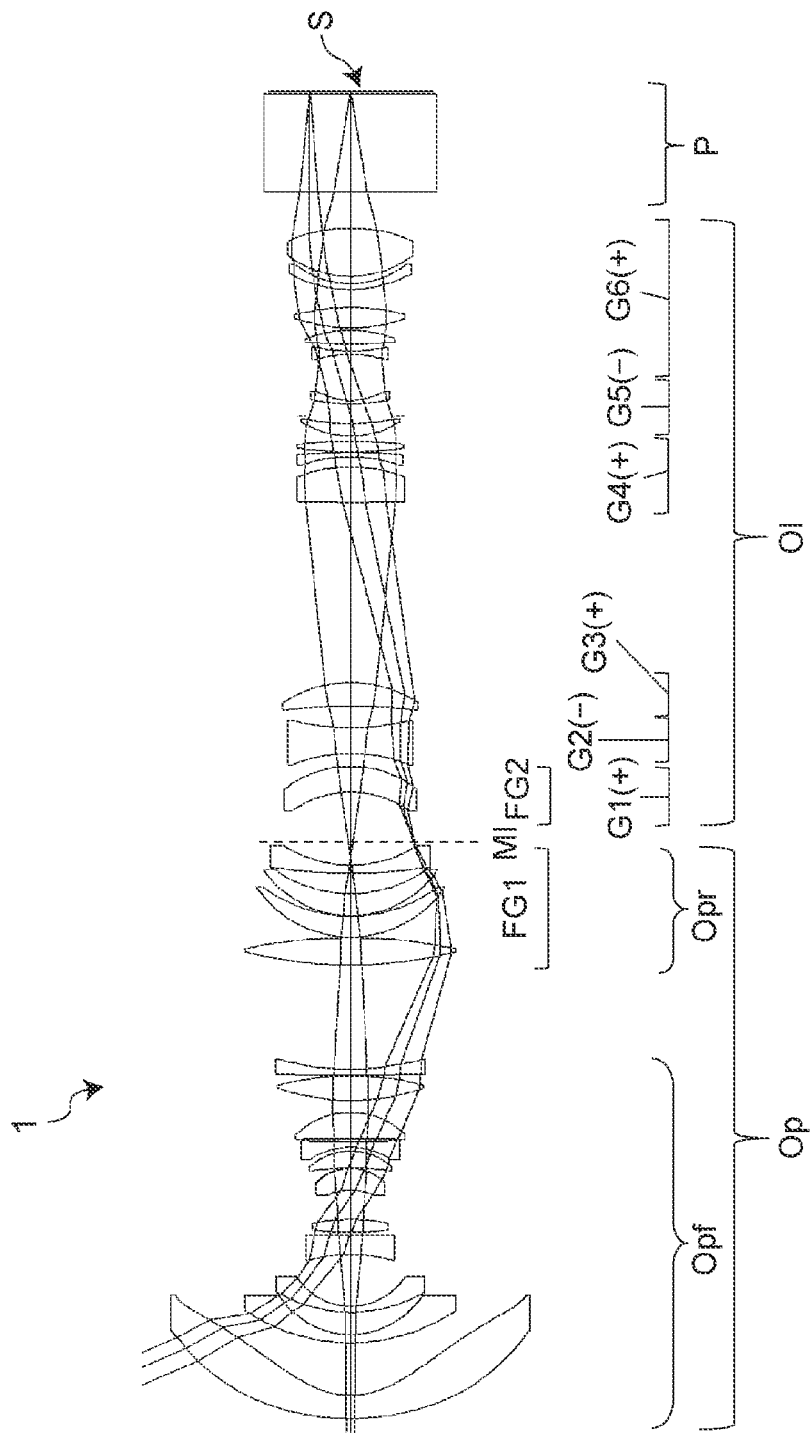

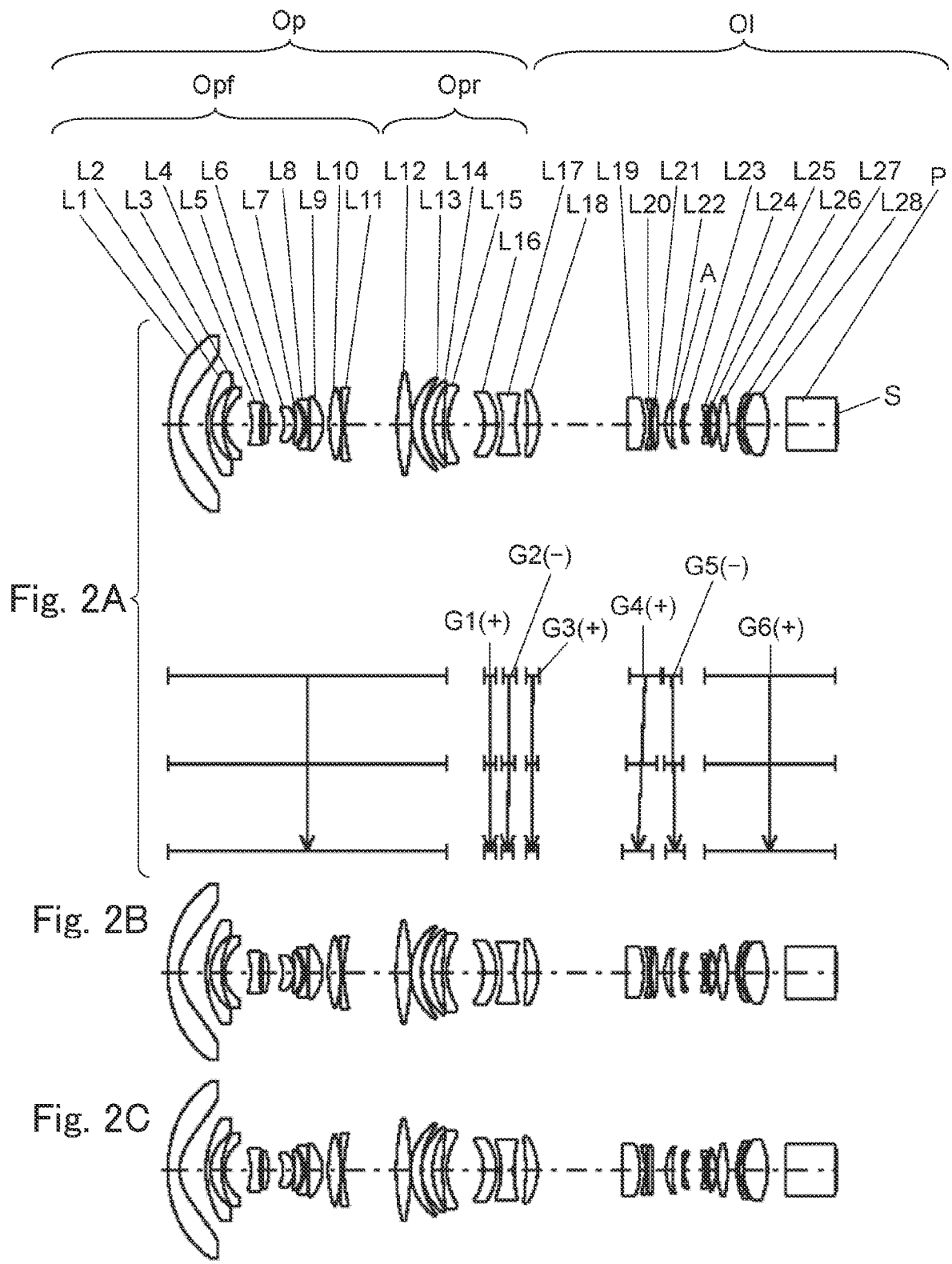

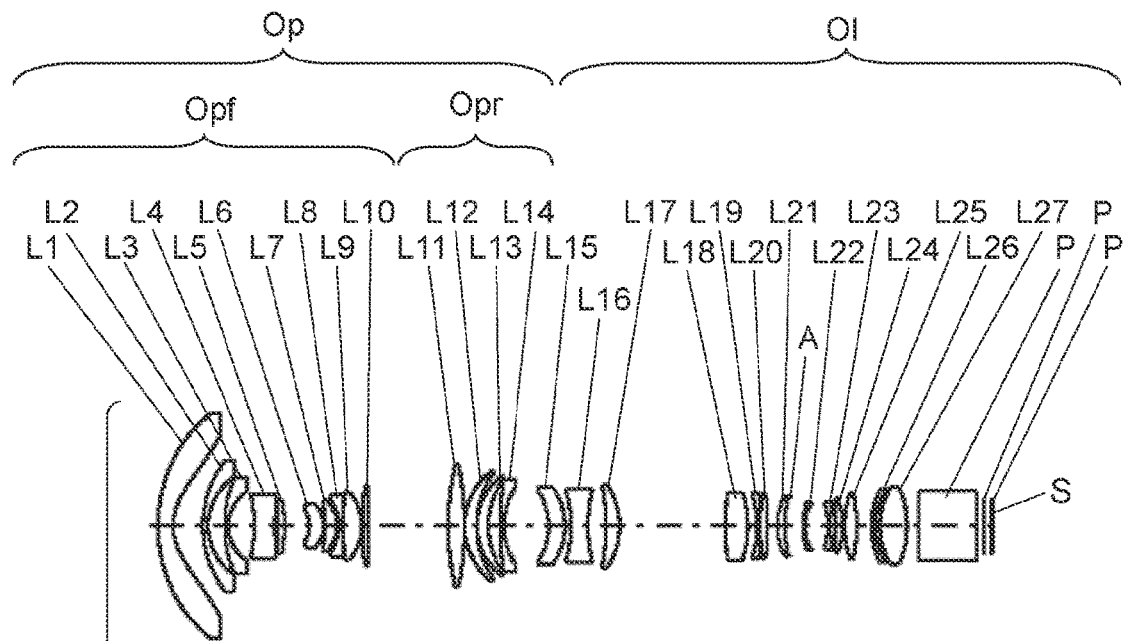
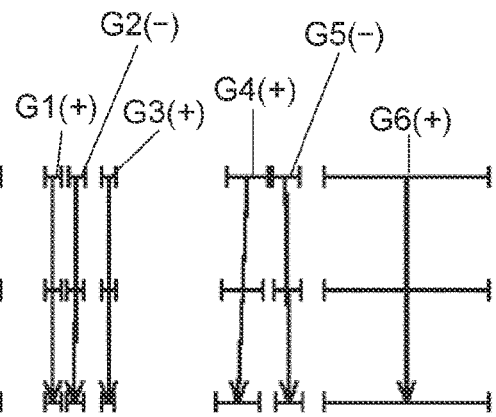
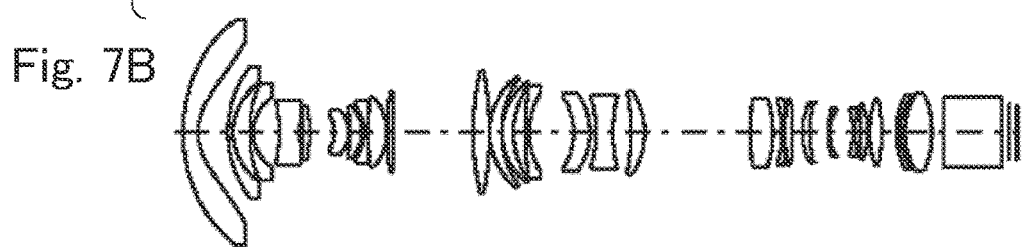
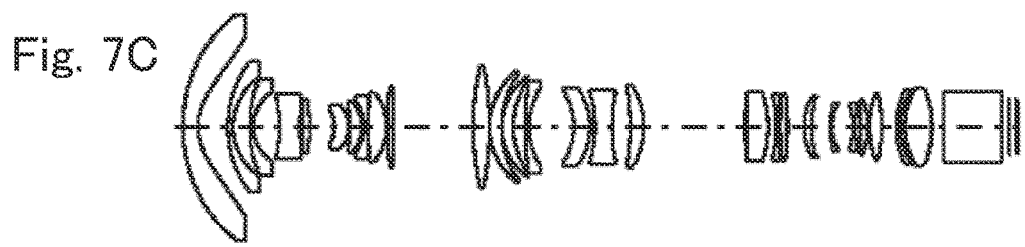

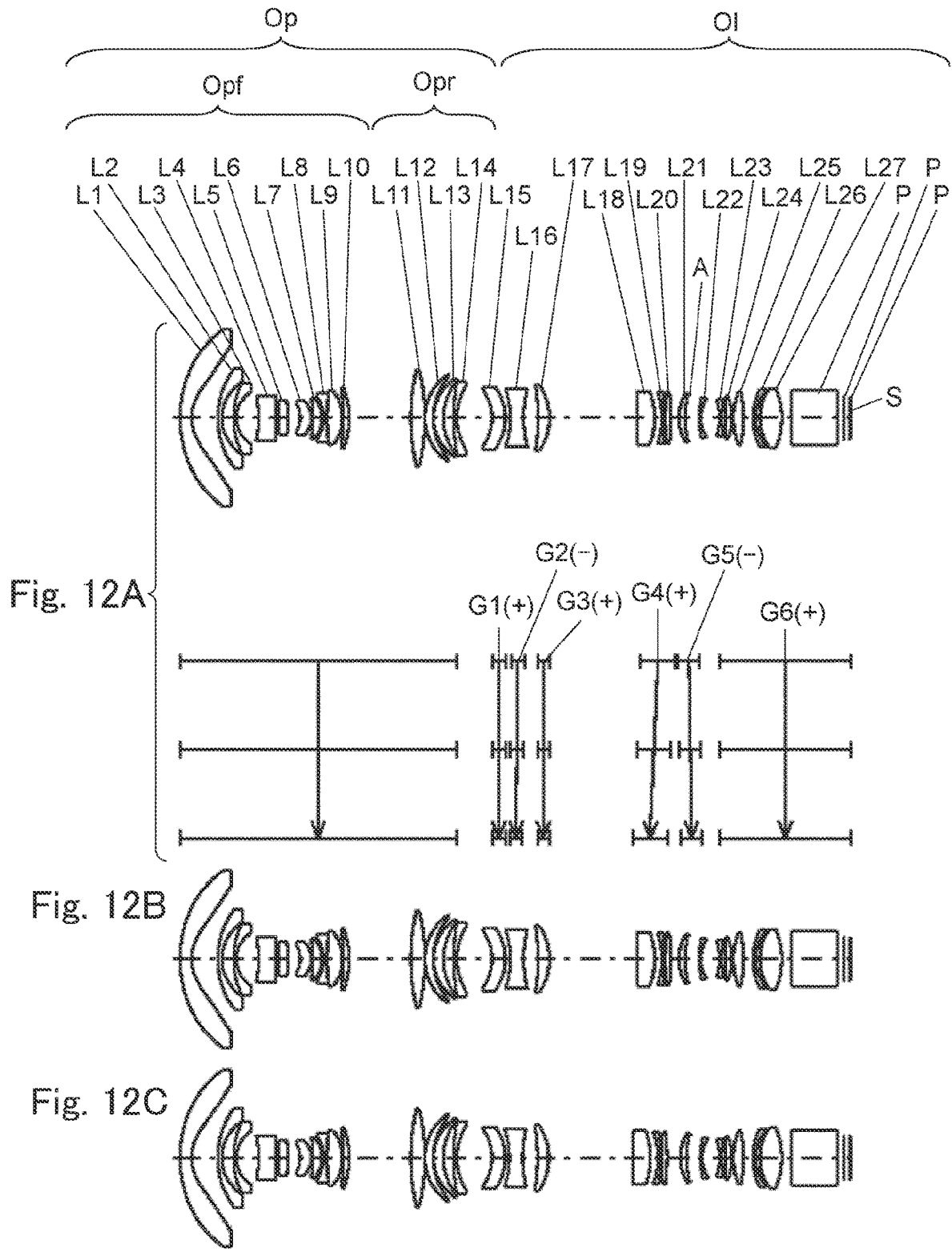

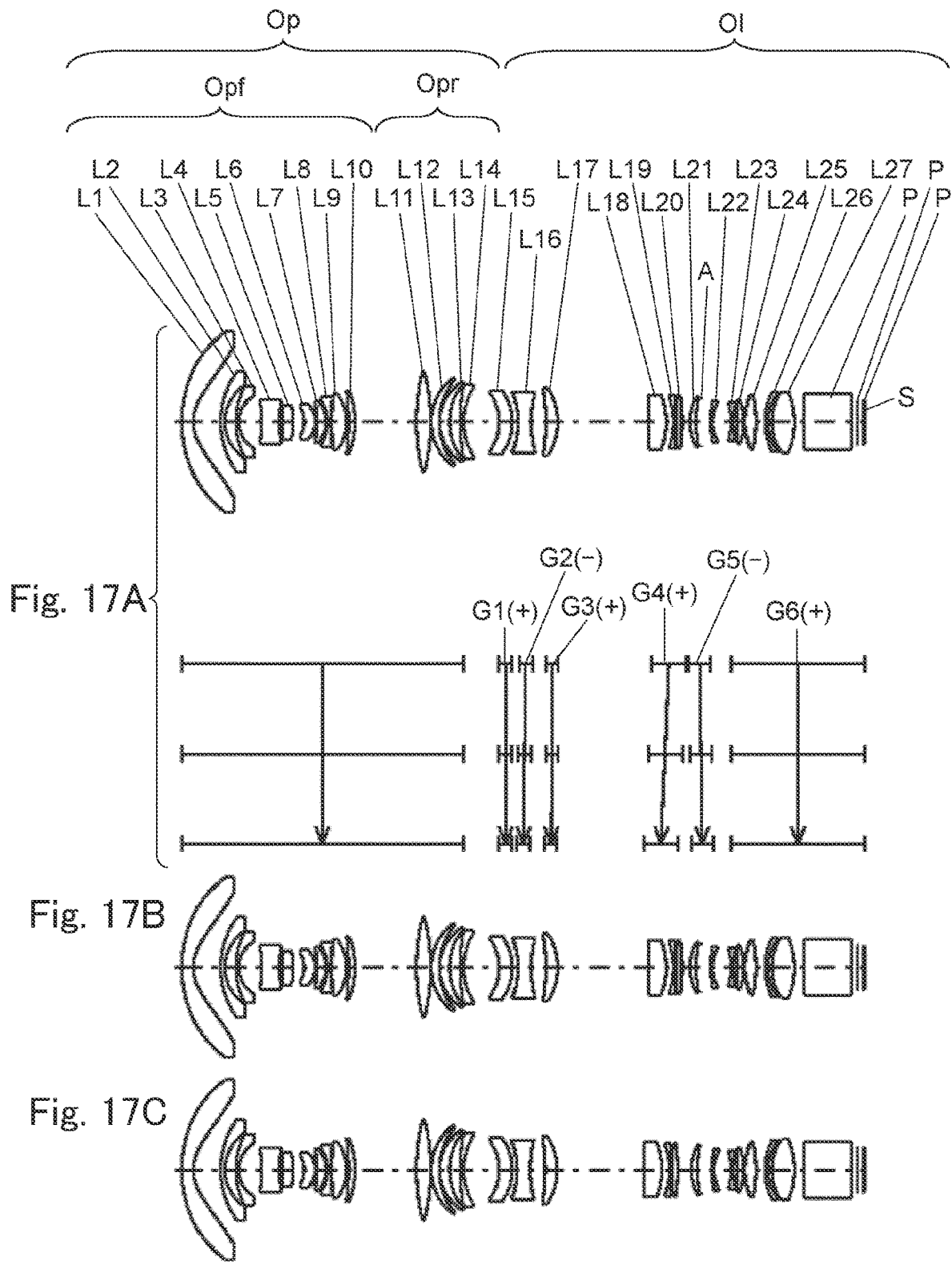

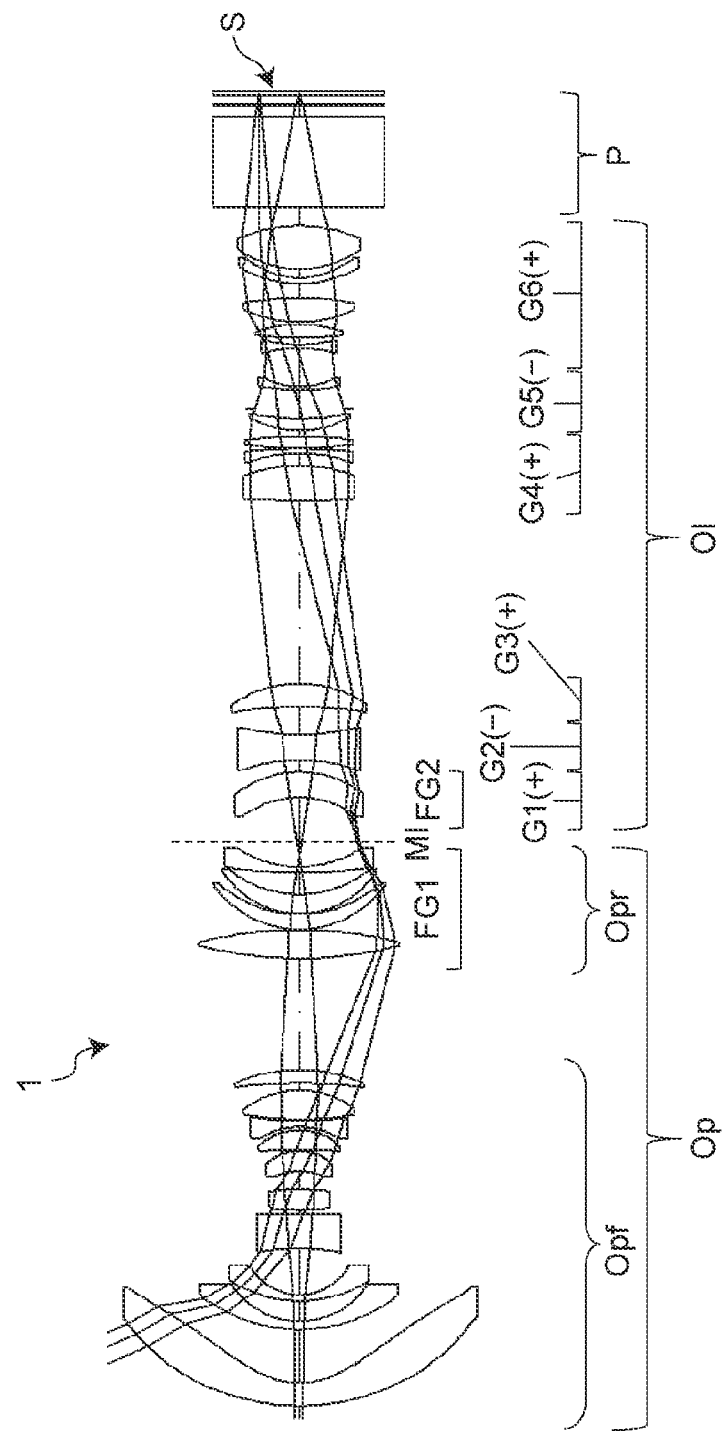

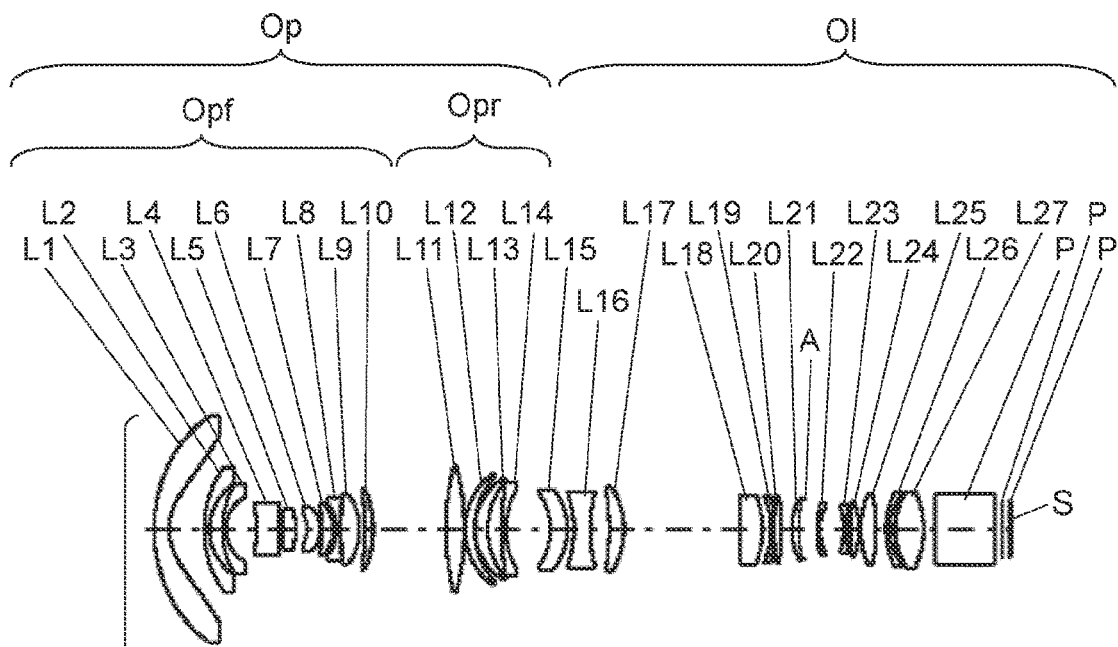
Fig. 22A
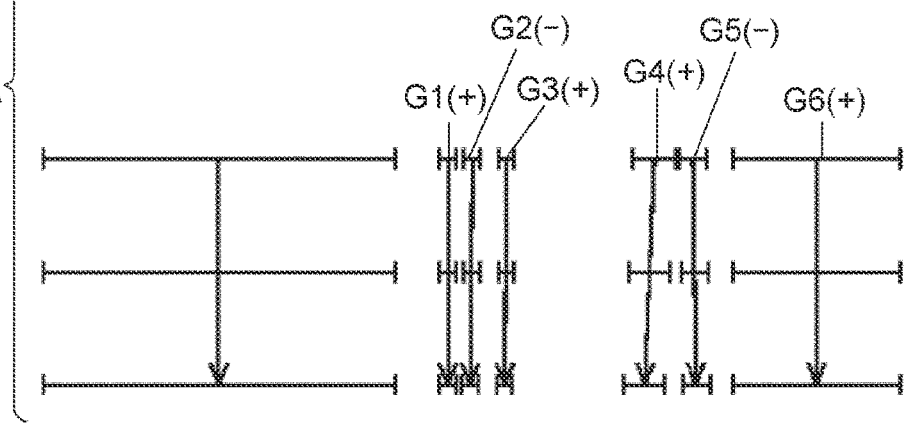
Fig. 22B
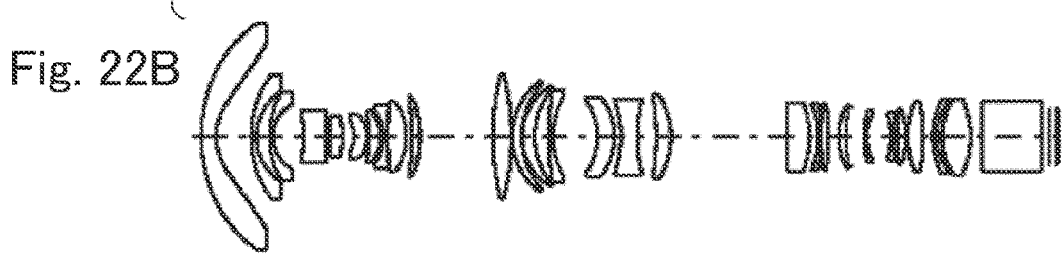
Fig. 22C
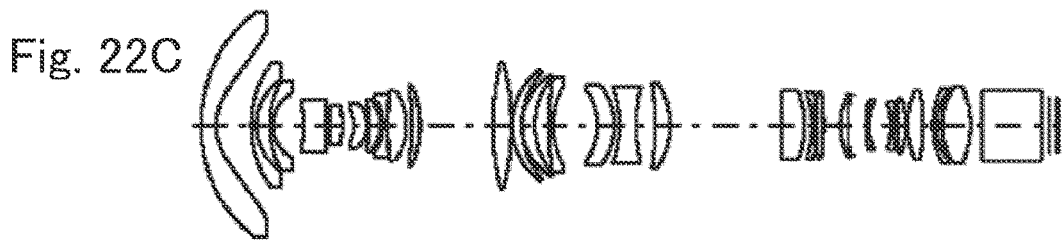

OPTICAL SYSTEM, IMAGE PROJECTION APPARATUS, AND IMAGING APPARATUS

CROSS-REFERENCE TO RELATED APPLICATIONS

This application is a continuation of International Patent Application No. PCT/JP2021/029380, filed on Aug. 6, 2021, which claims the benefit of Japanese Patent Application No. 2021-022596, filed on Feb. 16, 2021, the contents all of which are incorporated herein by reference.

TECHNICAL FIELD

The present disclosure relates to an optical system that forms an Intermediate image. The present disclosure also relates to an image projection apparatus and an imaging apparatus using such an optical system.

BACKGROUND ART

Intermediate imaging-based optical systems have an advantage of achieving wide-angle projection with a short focal length and a wide screen, while the total length of the optical system tends to be increased, thereby rendering the optical system heavier. When attaching a portion of the optical system to an outside of a hosing of an image projection apparatus body, a moment acting on the center of gravity may cause the optical system to tilt relative to the apparatus body, thereby possibly degrading the optical performance.

Patent Document 1 discloses a wide-angle imaging optical system, wherein the first lens L1a positioned closest to the magnification conjugate point has the largest diameter. The first lens L1a has aspherical double surfaces with quite complicated shapes.

PRIOR ART

[Patent Document 1] JP 2019-174633 A

SUMMARY OF THE INVENTION

The present disclosure provides an optical system in which the lens can be made wider in angle, and small in effective diameter, thereby the optical system and the zoom mechanism can be reduced in size and weight. The present disclosure also provides an image projection apparatus and an imaging apparatus using such an optical system.

One aspect of the present disclosure is directed to an optical system internally having an intermediate imaging position that is conjugate with both of a magnification conjugate point on a magnification side and a reduction conjugate point on a reduction side, the optical system comprising:
 a magnification optical system including a plurality of lens elements and positioned on the magnification side with respect to the intermediate imaging position; and
 a relay optical system including a plurality of lens elements and positioned on the reduction side with respect to the intermediate imaging position,
 wherein the magnification optical system is fixed with respect to the reduction conjugate point during zooming, and
 wherein the relay optical system includes a plurality of moving lens groups which are independently movable in an optical axis direction during zooming, and
 wherein the reduction side-closest moving lens group that is positioned closest to the reduction side among the plurality of moving lens groups has a negative refractive power.

Further, an image projection apparatus according to the present disclosure includes the above-described optical system and an image forming element that generates an image to be projected through the optical system onto a screen.

Still further, an imaging apparatus according to the present disclosure includes the above-described optical system and an imaging element that receives an optical image formed by the optical system to convert the optical image into an electrical image signal.

The present disclosure provides an optical system in which the lens can be made wider in angle, and small in effective diameter, thereby the optical system and the zoom mechanism can be reduced in size and weight.

BRIEF DESCRIPTION OF THE DRAWINGS

FIG. 1 is a layout diagram showing an optical path at a wide-angle end in a zoom lens system of example 1 for an object distance of 1100 mm.

FIGS. 2A-2C are layout diagrams of the zoom lens system according to example 1 for an object distance of 1100 mm.

FIGS. 7A-7C are Layout diagrams of the zoom lens system according to example 2 for an object distance of 1100 mm.

FIGS. 12A-12C are layout diagrams of the zoom lens system according to example 3 for an object distance of 1100 mm.

FIGS. 17A-17C are layout diagrams of the zoom lens system according to example 4 for an object distance of 1100 mm.

FIG. 21 is a layout diagram showing an optical path at a wide-angle end in a zoom lens system of example 5 for an object distance of 1100 mm.

FIGS. 22A-22C are layout diagrams of the zoom lens system according to example 5 for an object distance of 1100 mm.

DETAILED DESCRIPTION

Figure 3A:
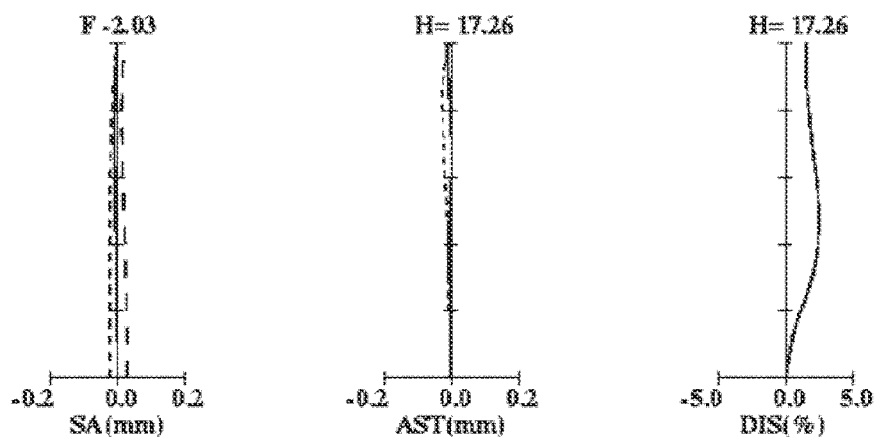
FIGS. 3A-3C are longitudinal aberration diagrams of the zoom lens system according to example 1 for an object distance of 1100 mm.
Figure 3B:
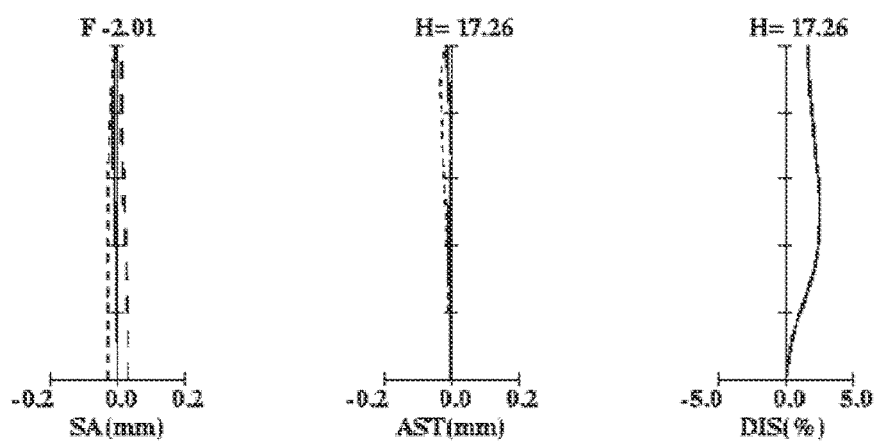
Figure 3C:
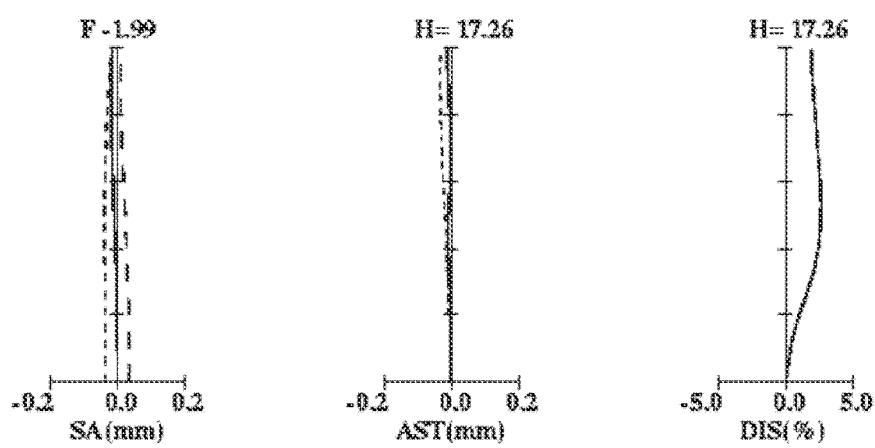
Figure 4A:
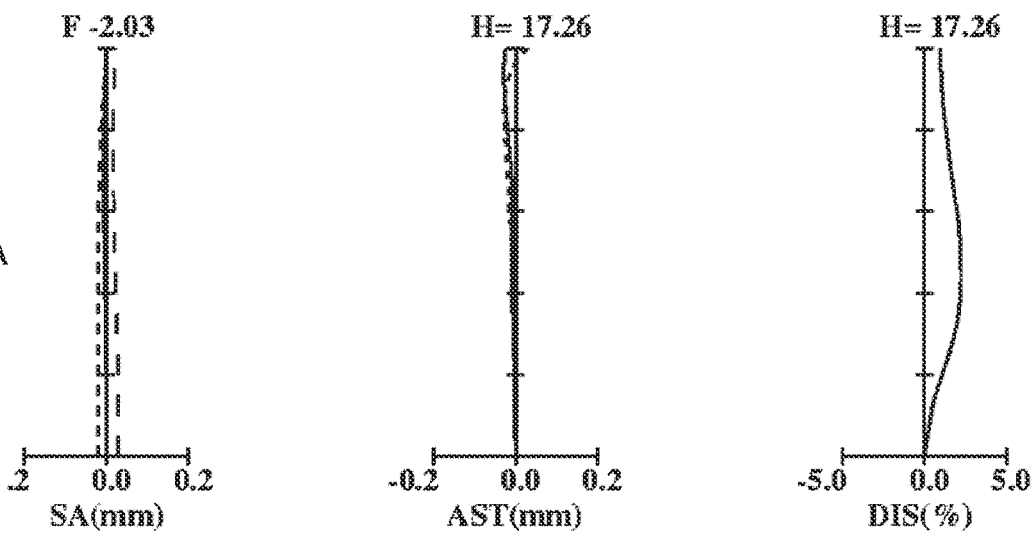
FIGS. 4A-4B are longitudinal aberration diagrams of the zoom lens system according to example 1 for object distances of 710 mm and 762 mm.
Figure 4B:
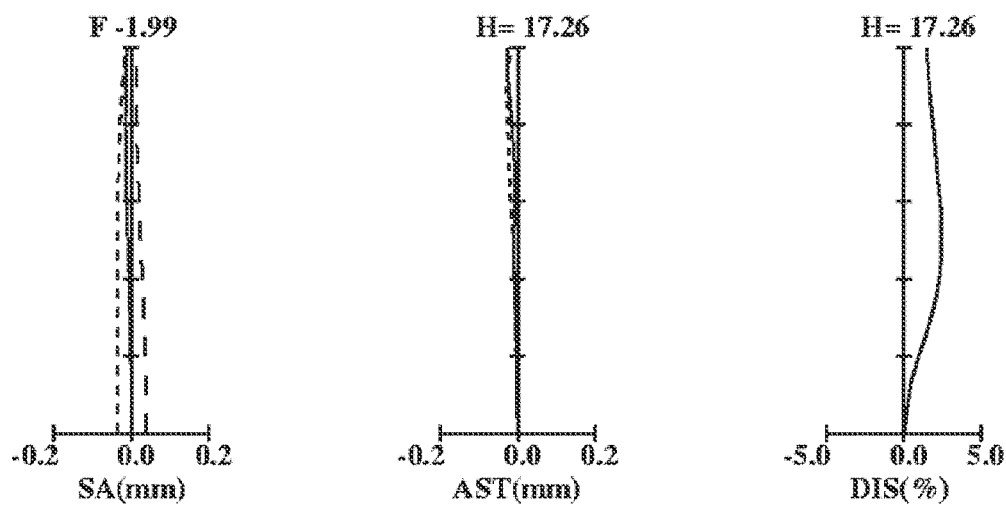
Figure 5A:
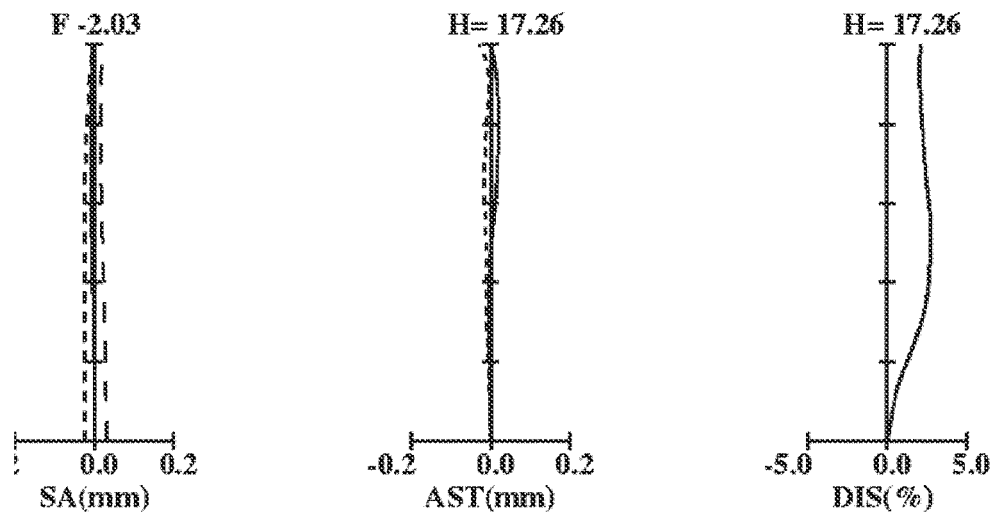
FIGS. 5A-5B are longitudinal aberration diagrams of the zoom lens system according to example 1 for object distances of 2842 mm and 3048 mm.
Figure 5B:
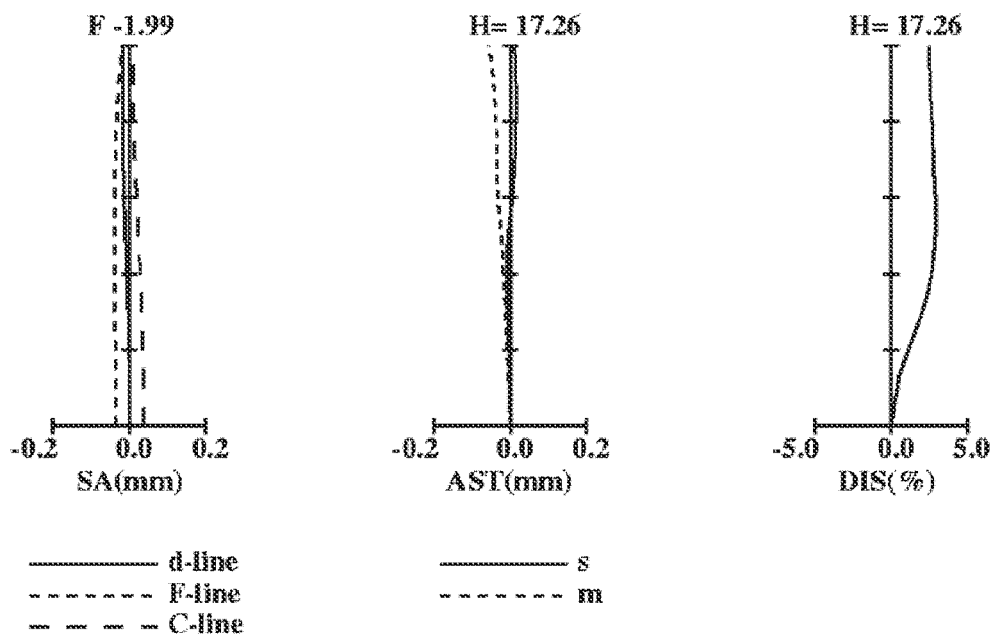
Figure 6:
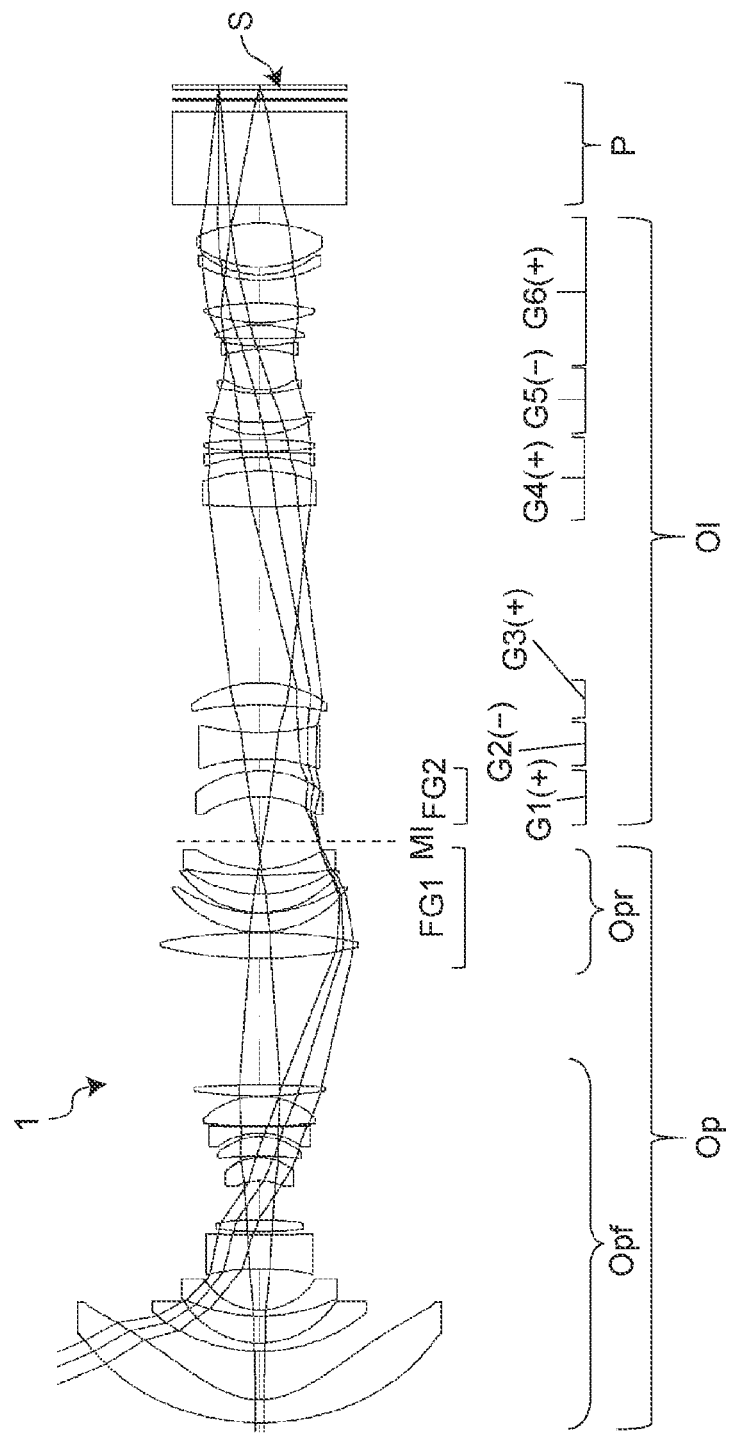
FIG. 6 is a layout diagram showing an optical path at a wide-angle end in a zoom lens system of example 2 for an object distance of 1100 mm.
Figure 8A:
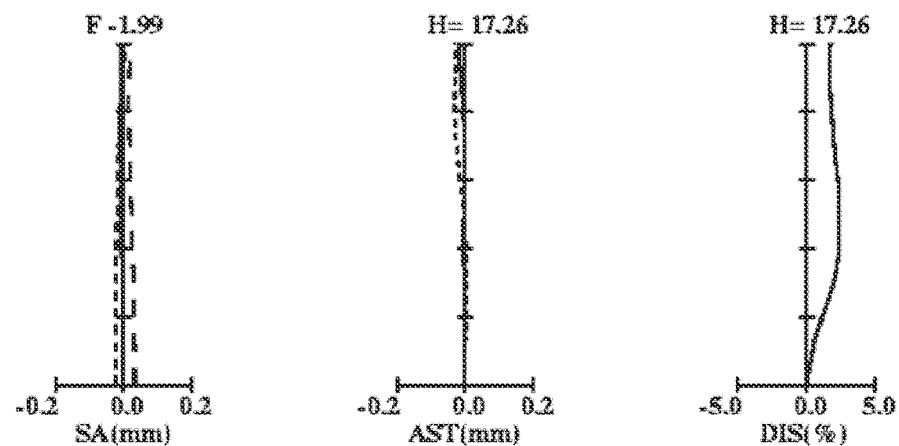
FIGS. 8A-8C are longitudinal aberration diagrams of the zoom lens system according to example 2 for an object distance of 1100 mm.
Figure 8B:
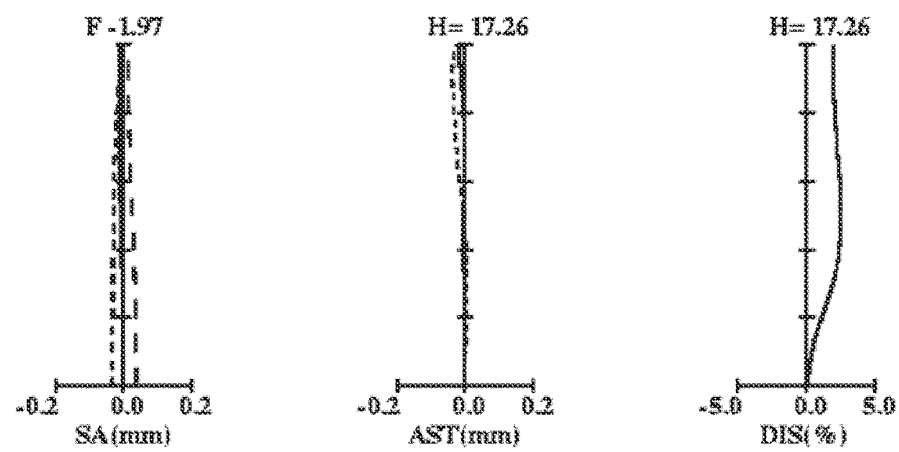
Figure 8C:
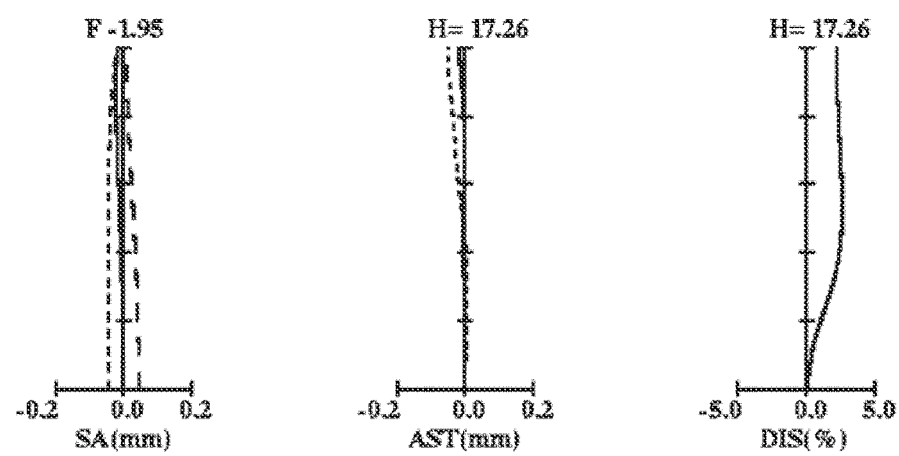
Figure 9A:
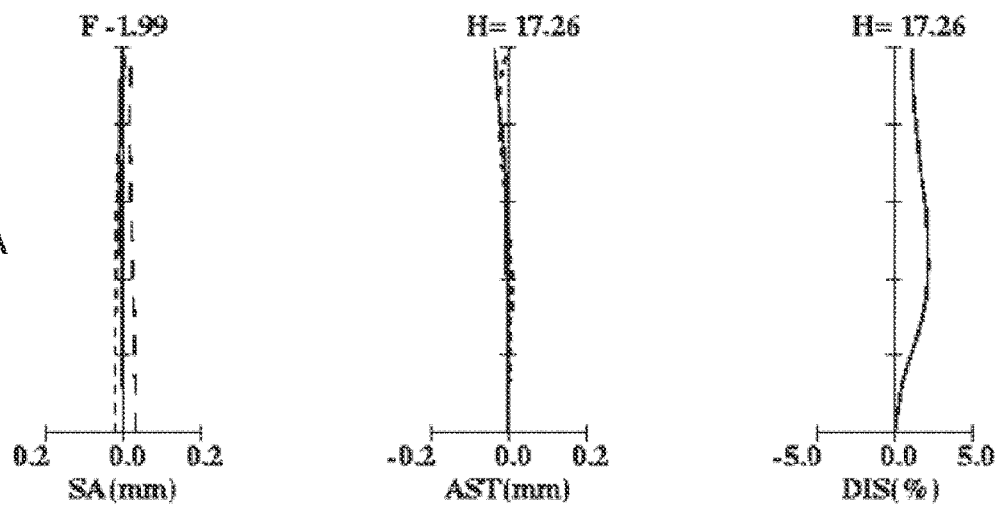
FIGS. 9A-9B are longitudinal aberration diagrams of the zoom lens system according to example 2 for object distances of 710 mm and 762 mm.
Figure 9B:
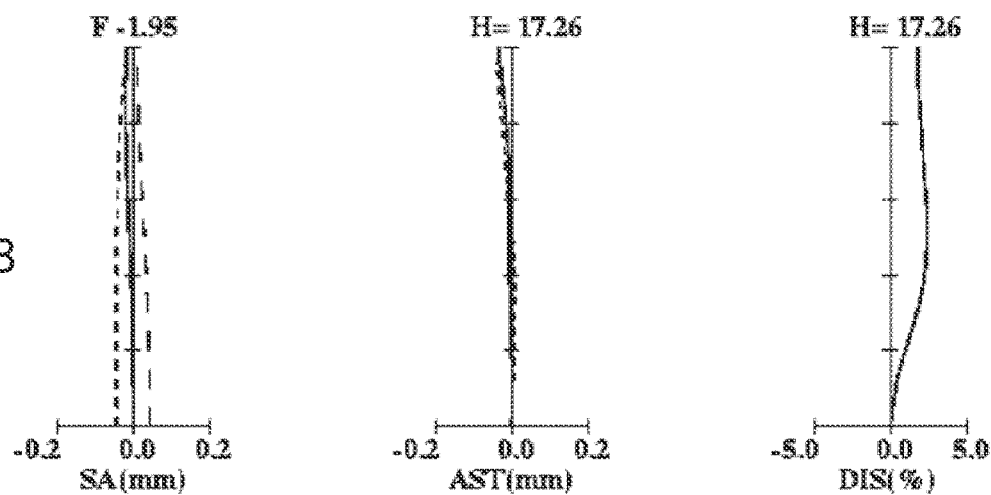
Figure 10A:
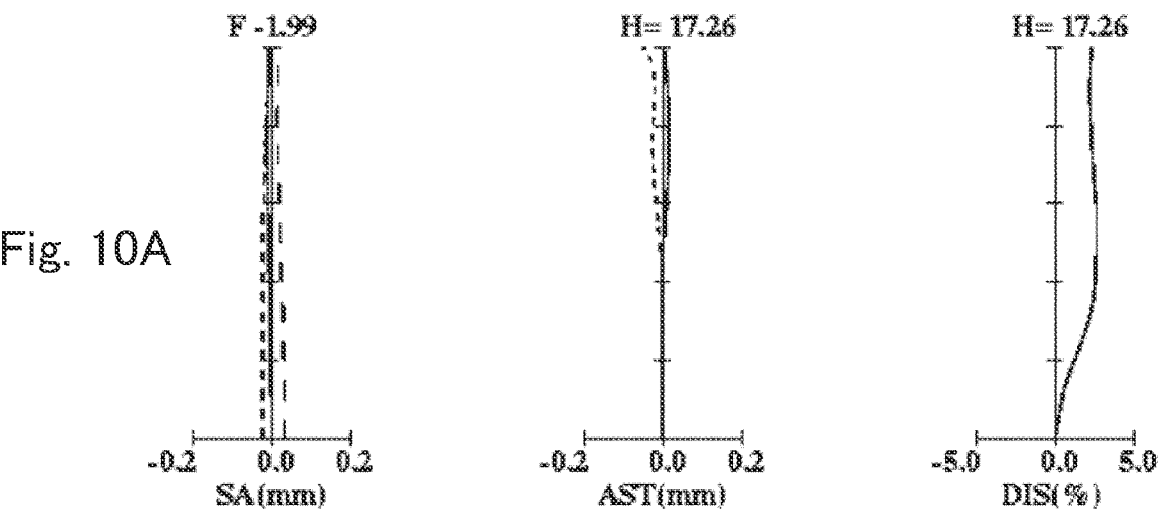
FIGS. 10A-10B are longitudinal aberration diagrams of the zoom lens system according to example 2 for object distances of 2842 mm and 3048 mm.
Figure 10B:
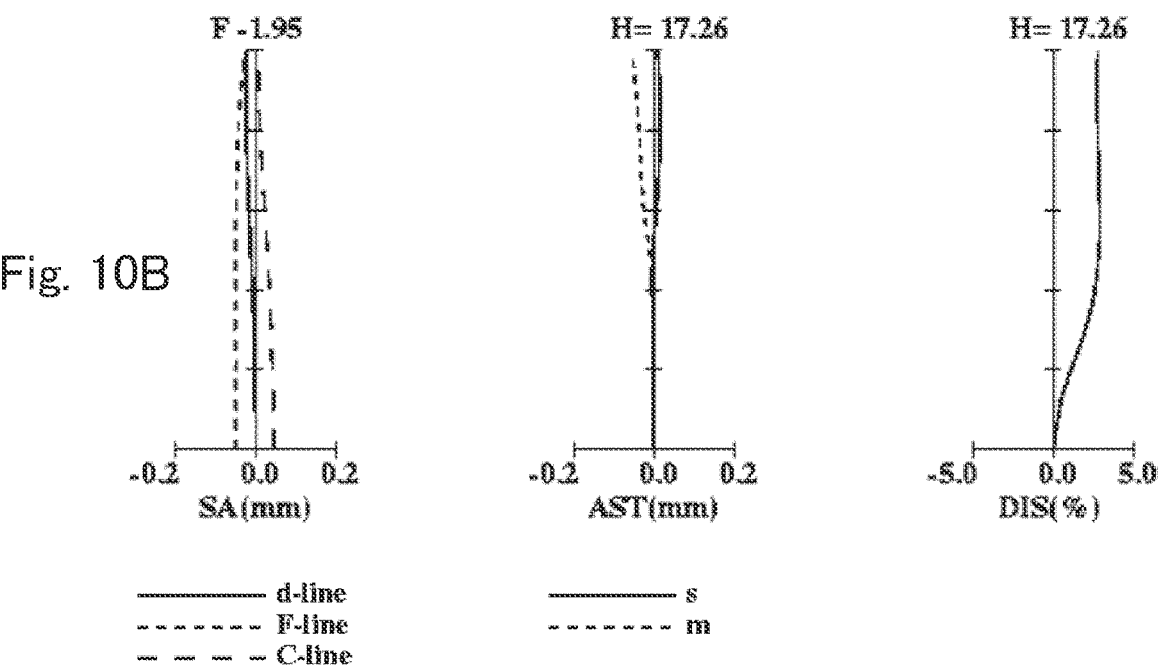
Figure 11:
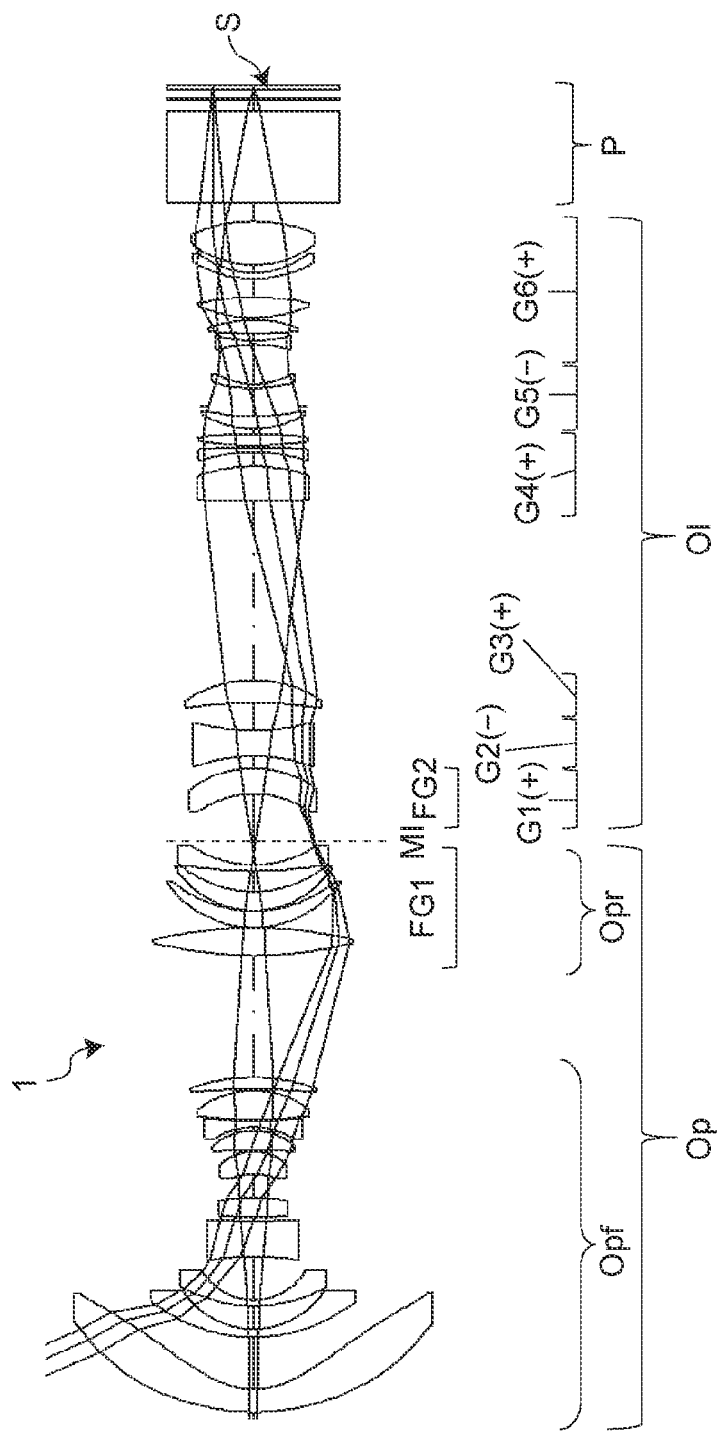
FIG. 11 is a layout diagram showing an optical path at a wide-angle end in a zoom lens system of example 3 for an object distance of 1100 mm.
Figure 13A:
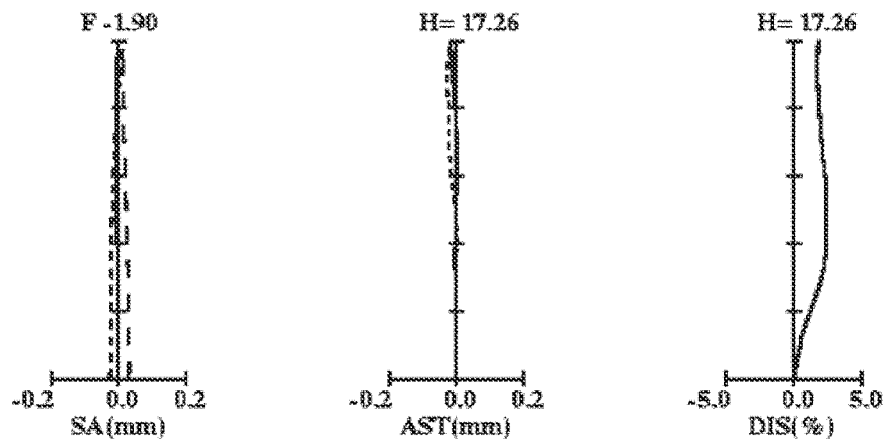
FIGS. 13A-13C are longitudinal aberration diagrams of the zoom lens system according to example 3 for an object distance of 1100 mm.
Figure 13B:
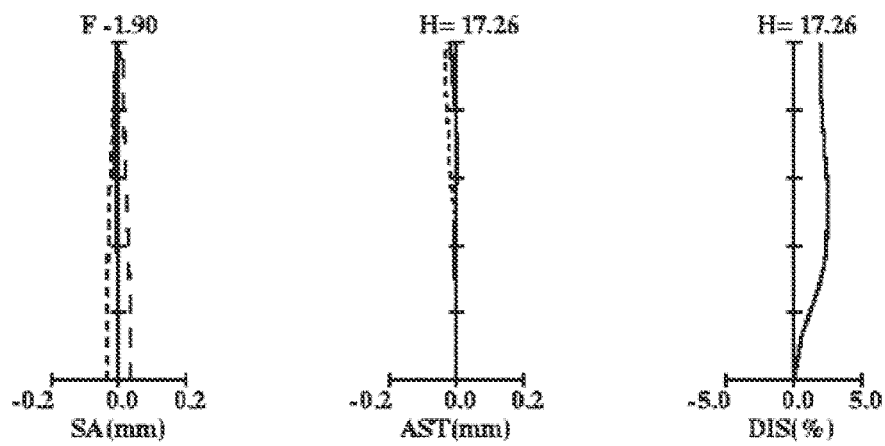
Figure 13C:
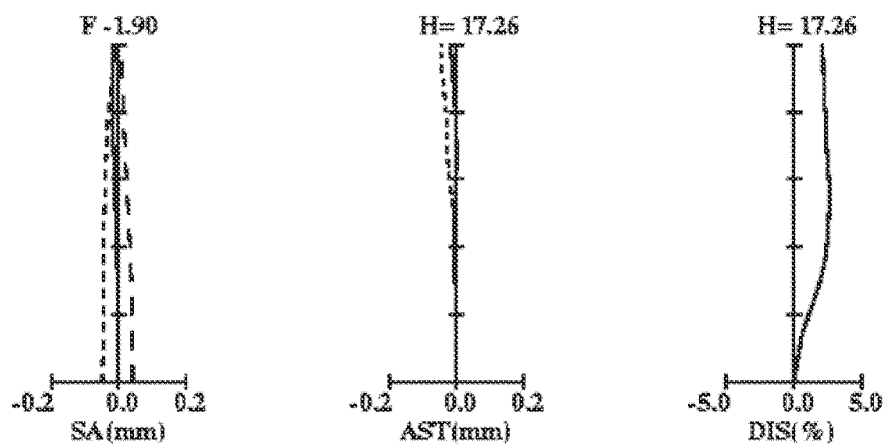
Figure 14A:
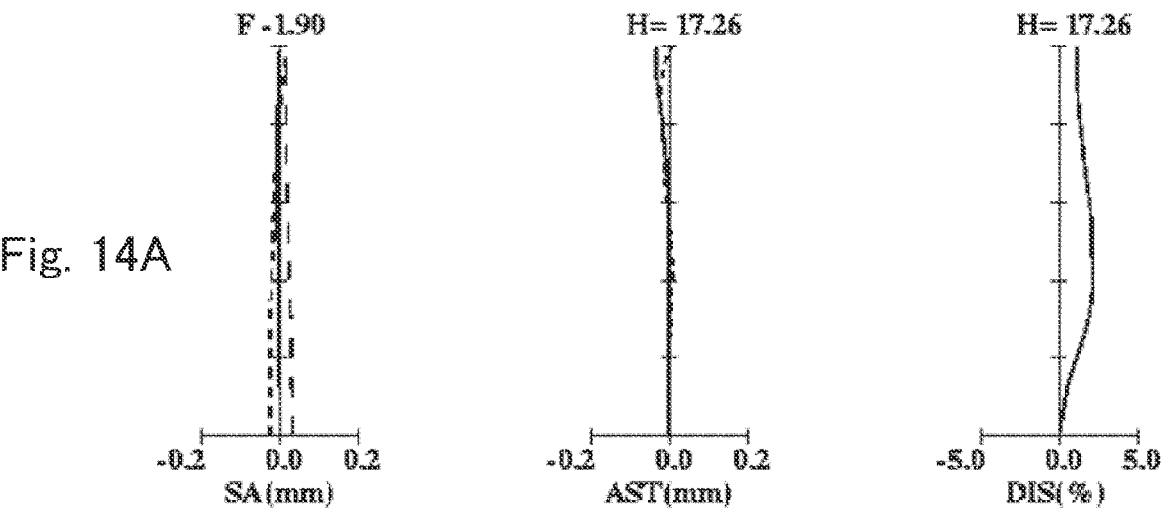
FIGS. 14A-14B are longitudinal aberration diagrams of the zoom lens system according to example 3 for object distances of 710 mm and 762 mm.
Figure 14B:
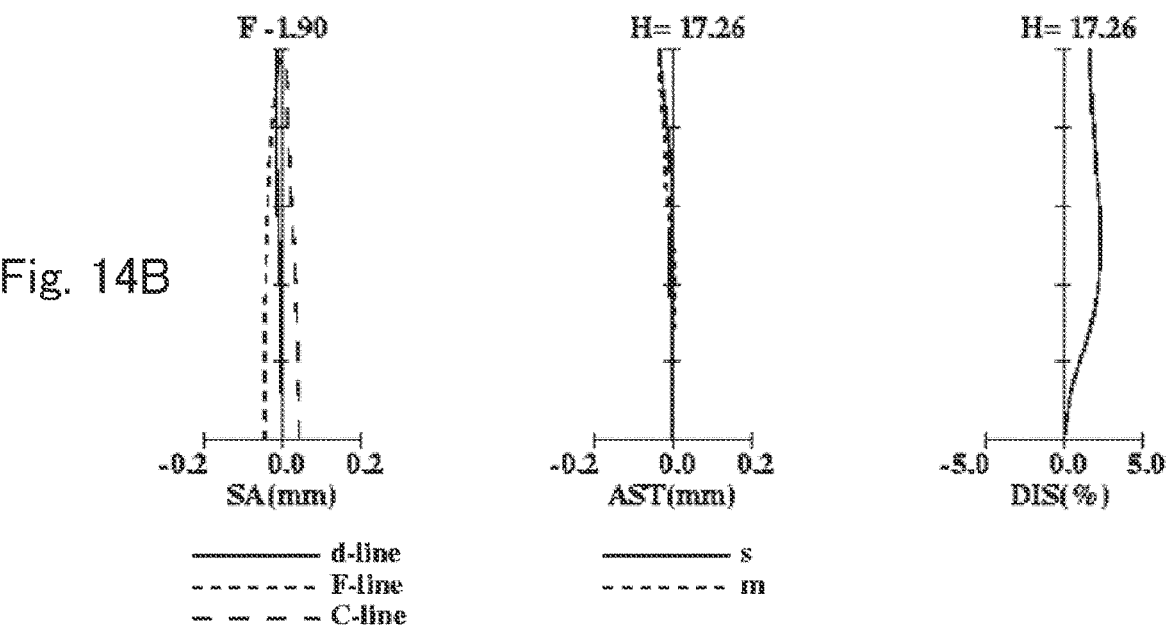
Figure 15A:
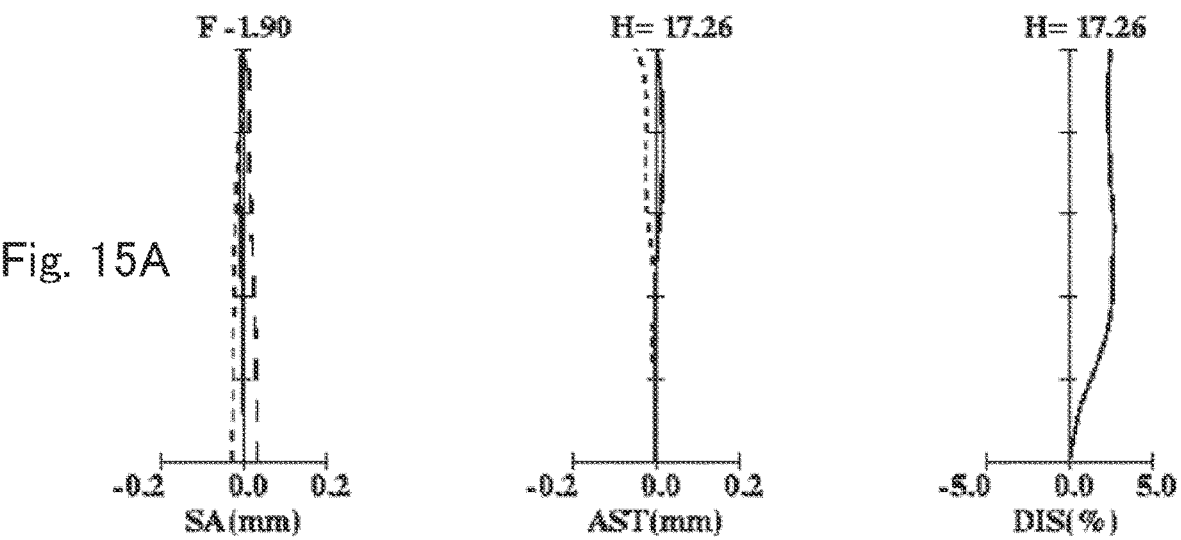
FIGS. 15A-15B are longitudinal aberration diagrams of the zoom lens system according to example 3 for object distances of 2842 mm and 3048 mm.
Figure 15B:
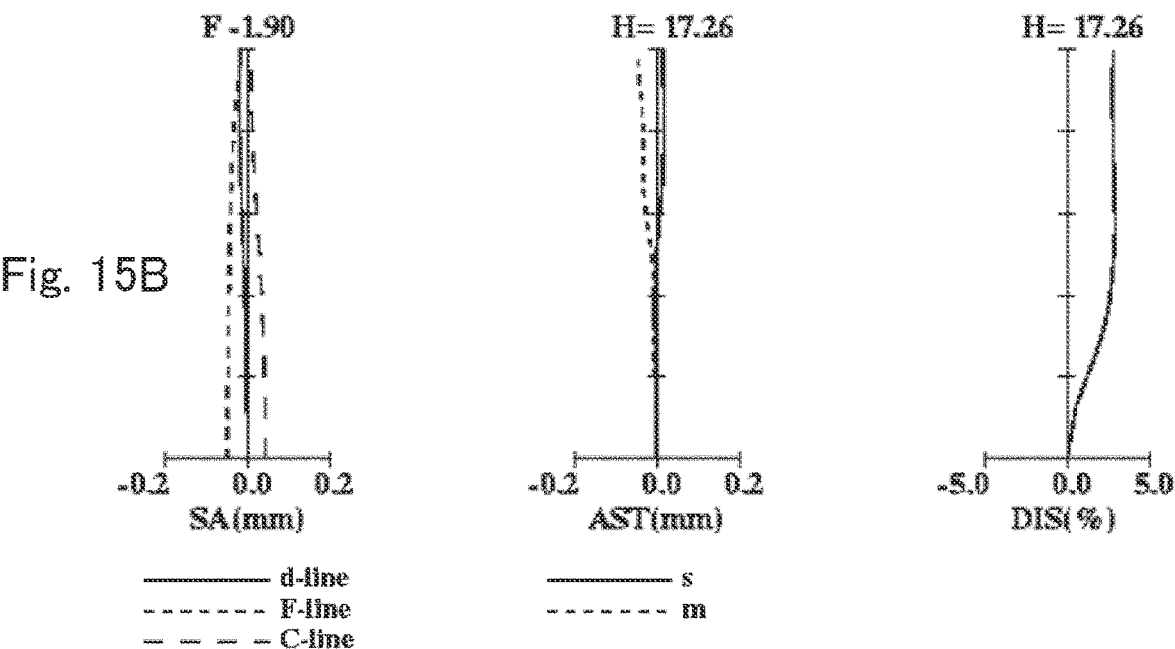
Figure 16:
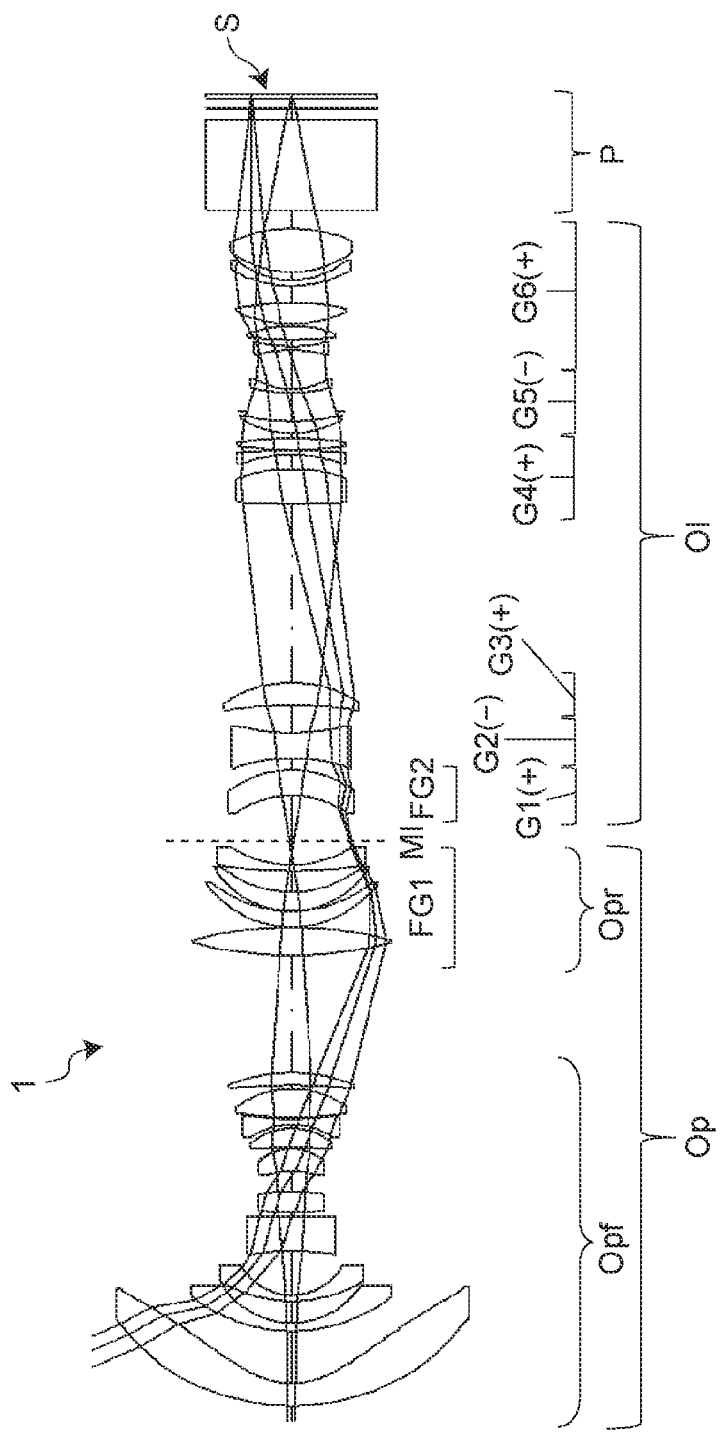
FIG. 16 is a layout diagram showing an optical path at a wide-angle end in a zoom lens system of example 4 for an object distance of 1100 mm.
Figure 18A:
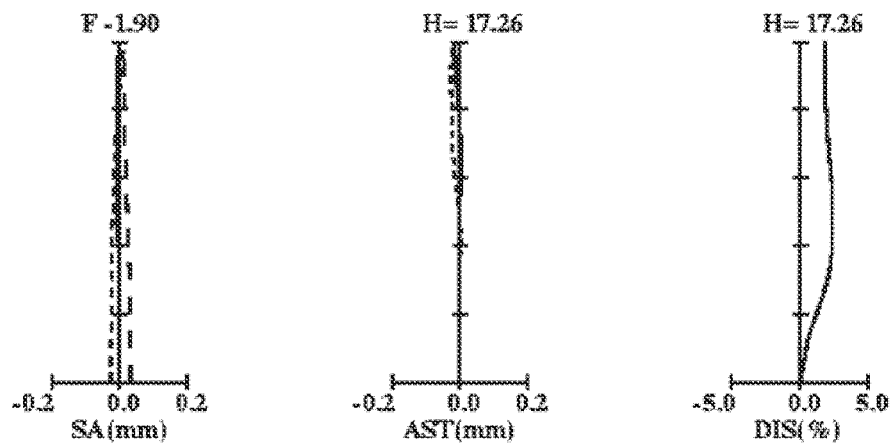
FIGS. 18A-18C are longitudinal aberration diagrams of the zoom lens system according to example 4 for an object distance of 1100 mm.
Figure 18B:
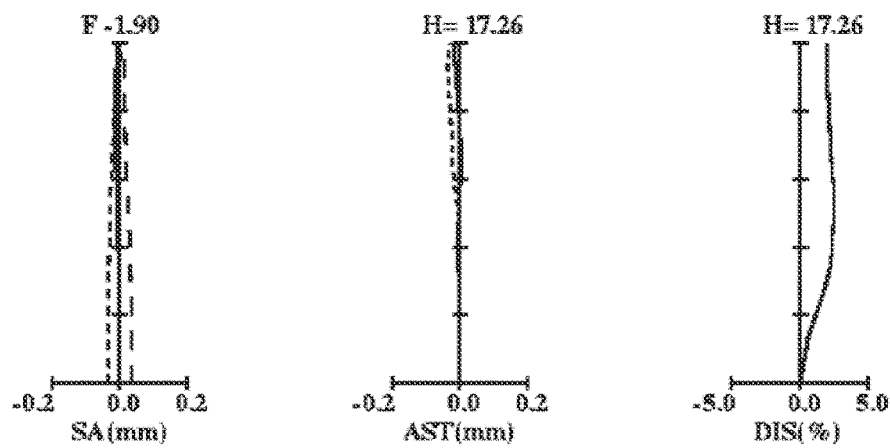
Figure 18C:
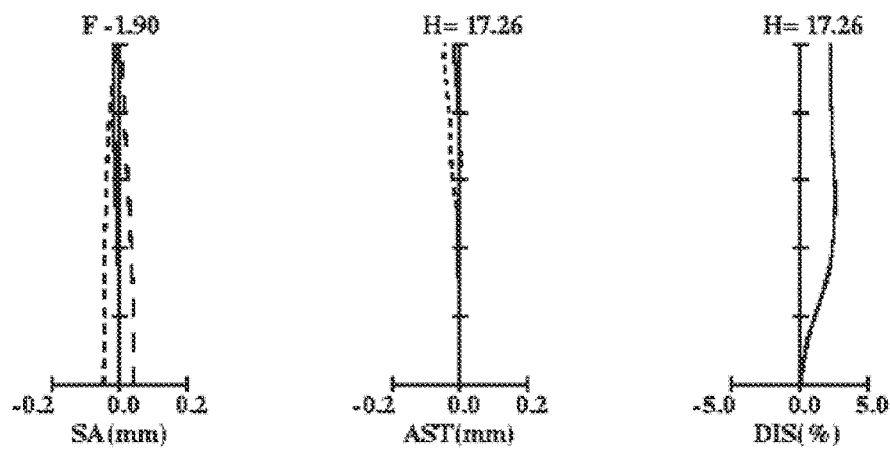
Figure 19A:
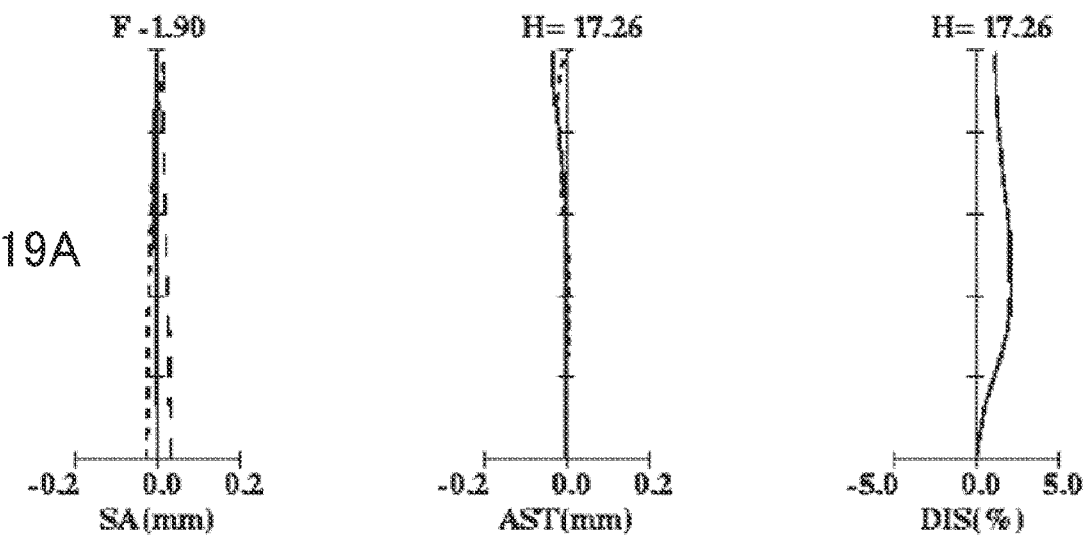
FIGS. 19A-19B are longitudinal aberration diagrams of the zoom system according to example 4 for object lens distances of 710 mm and 762 mm.
Figure 19B:
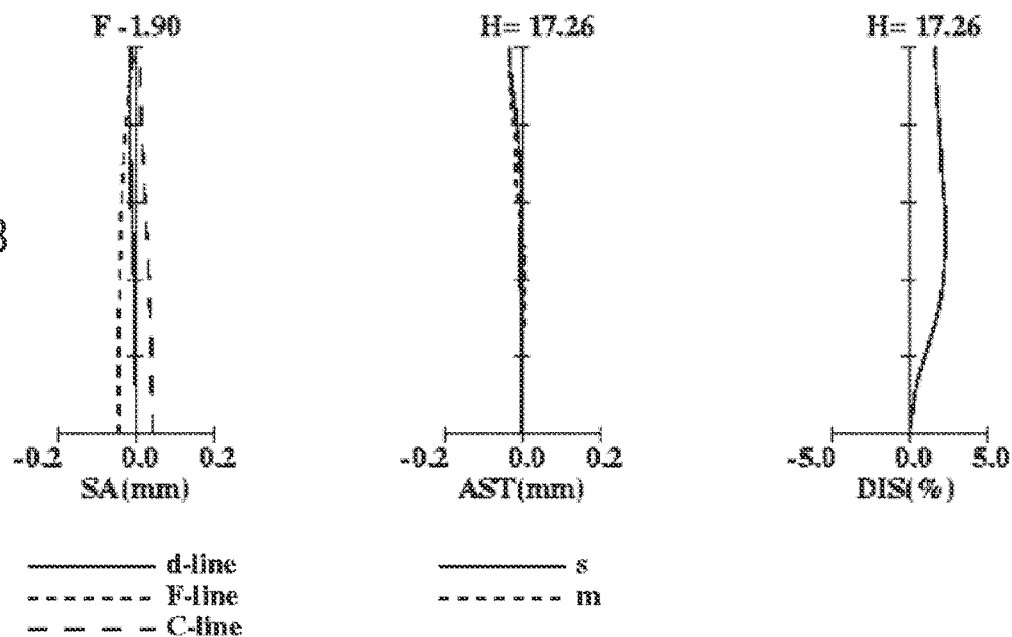
Figure 20A:
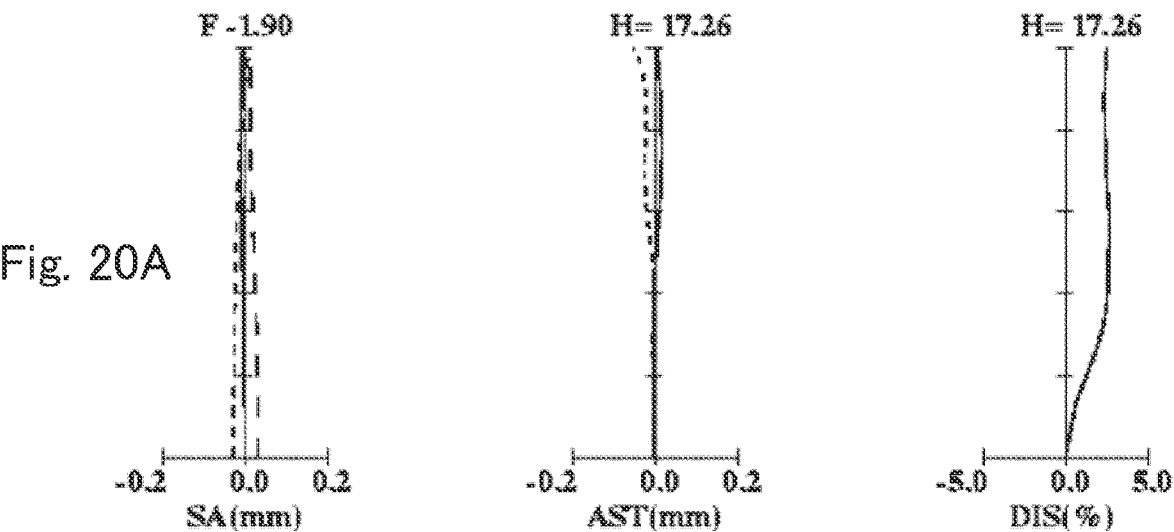
FIGS. 20A-20B are longitudinal aberration diagrams of the zoom lens system according to example 4 for object distances of 2842 mm and 3048 mm.
Figure 20B:
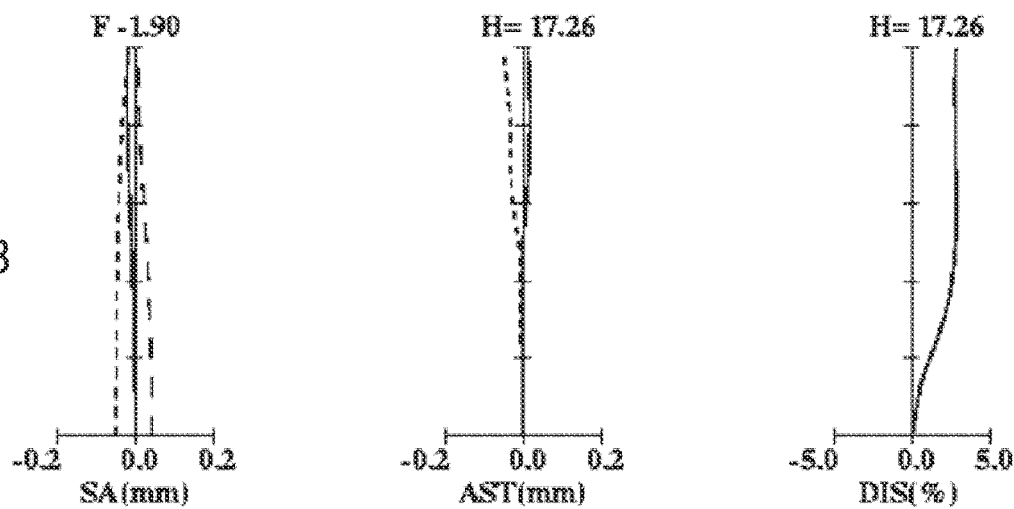
Figure 23A:
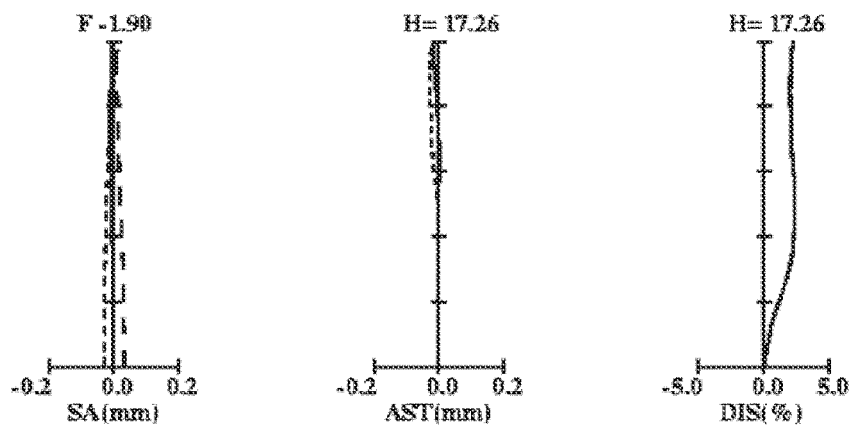
FIGS. 23A-23C are longitudinal aberration diagrams of the zoom lens system according to example 5 for an object distance of 1100 mm.
Figure 23B:
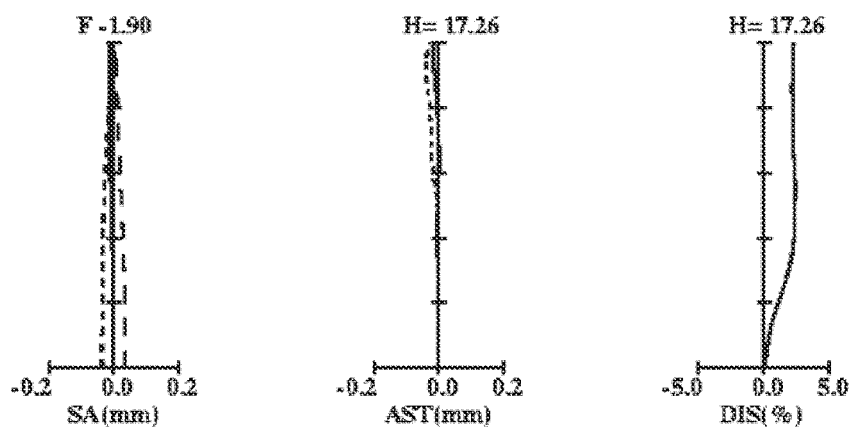
Figure 23C:
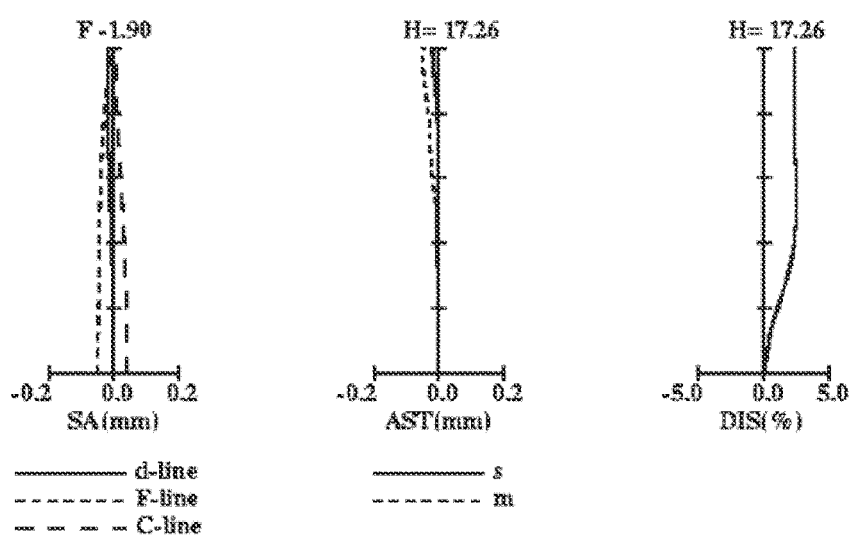
Figure 24A:
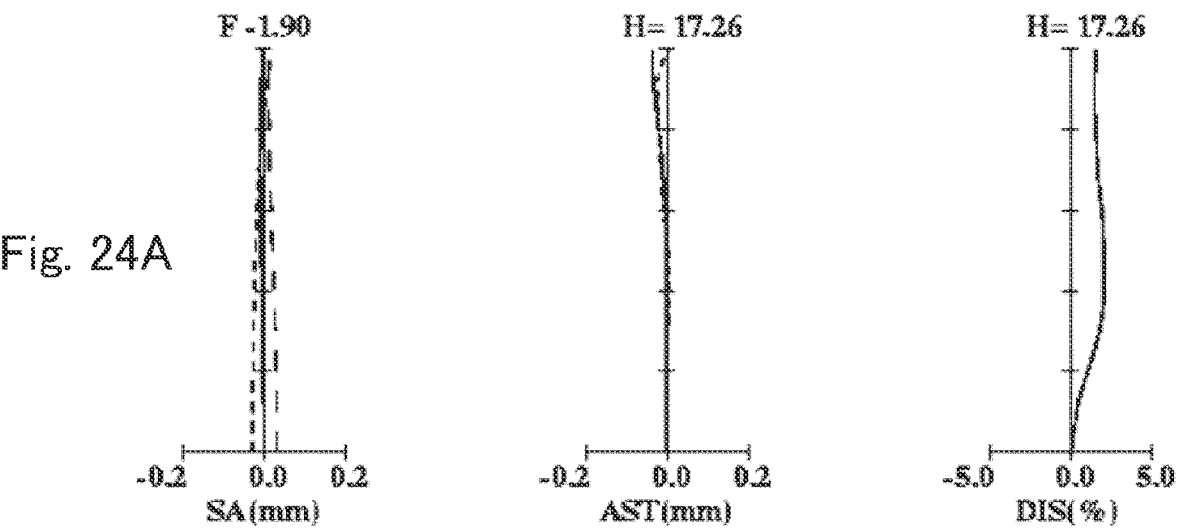
FIGS. 24A-24B are longitudinal aberration diagrams of the zoom lens system according to example 5 for object distances of 710 mm and 762 mm.
Figure 24B:
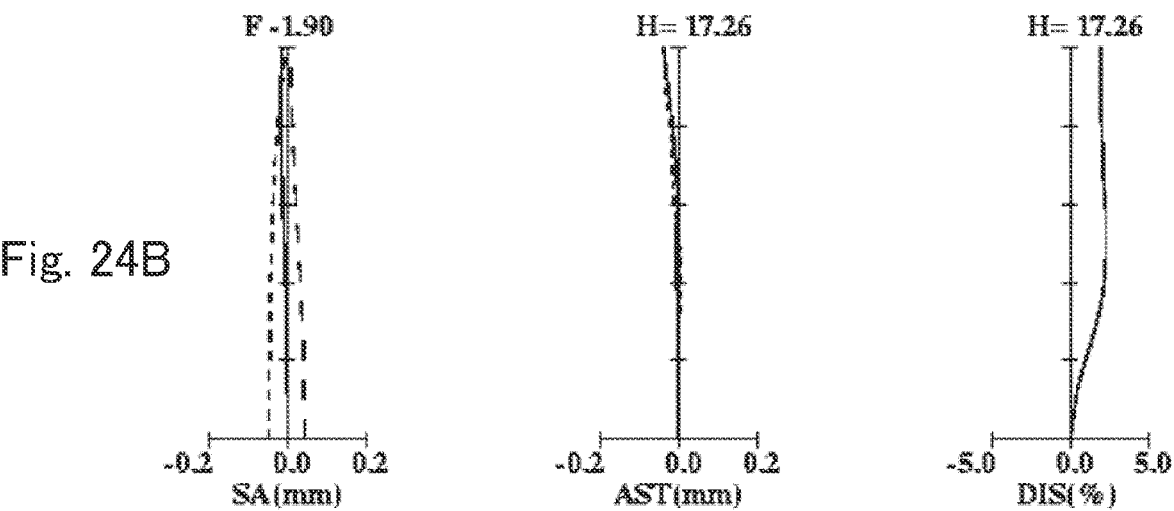
Figure 25A:
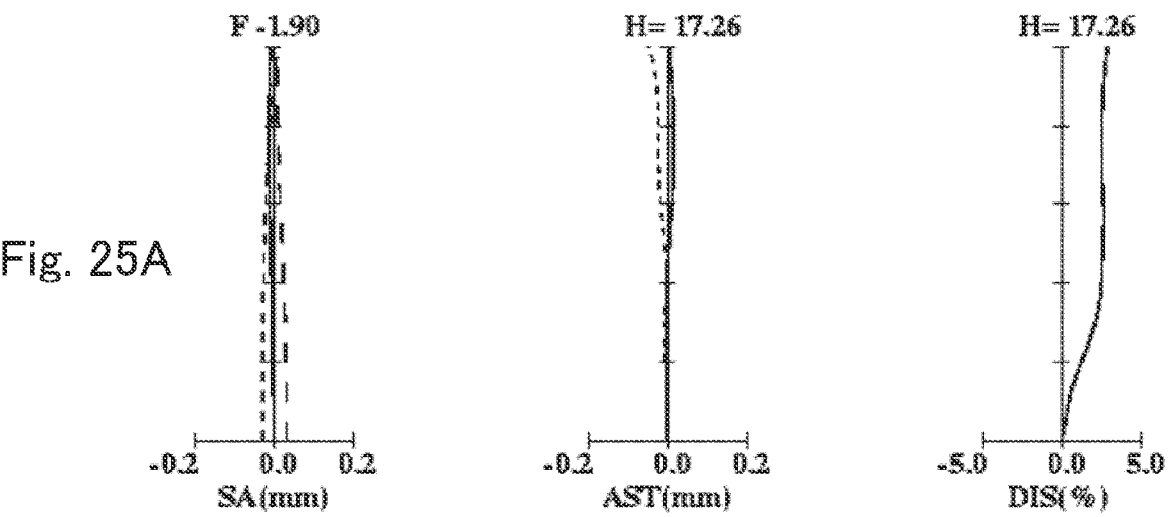
FIGS. 25A-25B are longitudinal aberration diagrams of the zoom lens system according to example 5 for object distances of 2842 mm and 3048 mm.
Figure 25B:
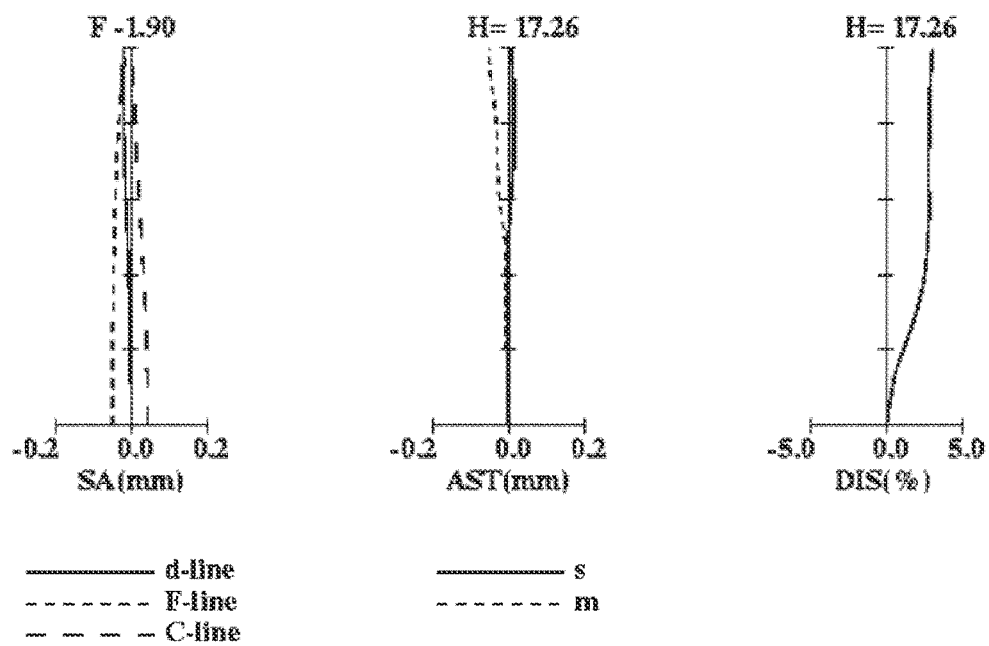

Hereinafter, embodiments are described in detail with reference to the drawings as appropriate. However, unnecessarily detailed descriptions may be omitted. For example, detailed descriptions of well-known items or redundant descriptions of substantially the same configurations may be omitted. This is to prevent the following description from being unnecessarily redundant and to facilitate understanding by those skilled in the art.

It should be noted that the applicant provides the accompanying drawings and the following description for those skilled in the art to fully understand the present disclosure, and it is not intended to limit the subject matter described in the claims thereby.

Each example of an optical system according to the present disclosure is described below. In each example, described is an example in which the optical system is used in a projector (an example of an image projection apparatus) that projects onto a screen image light of an original image S obtained by spatially modulating incident light using an image forming element, such as liquid crystal or digital micromirror device (DMD), based on an image signal. In other words, the optical system according to the present disclosure can be used for magnifying the original image S on the image forming element arranged on the reduction side to project the image onto the screen (not shown), which is arranged on an extension line on the magnification side.

Further, the optical system according to the present disclosure can also be used for collecting light omitted from an object located the extension line on the magnification side to form an optical image of the object on and imaging surface of an imaging element arranged on the reduction side.

First Embodiment

Hereinafter, the first embodiment of the present disclosure will be described with reference to FIGS. 1 to 25. Here, a zoom lens system will be described as an example of the optical system.

FIGS. 1, 6, 11, 16, and 21 are layout diagrams showing an optical path at a wide angle end in a zoom lens system according to any of examples 1 to 5 for an object distance of 1100 m. FIGS. 2A-2C, 7A-7C, 12A-12C, 17A-17C and 22A-22C are Layout diagrams of the zoom lens systems according to examples 1 to 5 for an object distance of 1100 mm. FIGS. 2A, 7A, 12A, 17A, and 22A show lens layout diagrams at the wide angle end in the zoom lens system. FIGS. 2B, 7B, 12B, 17B, and 22B show lens layout diagrams at an intermediate position in the zoom lens system. FIGS. 2C, 7C, 12C, 17C, and 22C show lens layout diagrams at a telephoto end in the zoom lens system.

The wide-angle end is defined as the shortest focal length state in which the entire optical system has the shortest focal length fw. The intermediate position is defined as an intermediate focal length state between the wide-angle end and the telephoto end. The telephoto end is defined as the longest focal length state in which the entire optical system has the longest focal length ft. By using the focal length fw at the wide-angle end and the focal length ft at the telephoto end, the focal length fm at the intermediate position can be defined as fm=√(fw×ft) (√: square root).

The zoom lens systems according to examples 1 to 5 internally includes an intermediate imaging position MI that is conjugate with both of a magnification conjugate point on a magnification side and a reduction conjugate point on a reduction side. A magnification optical system Op is arranged the magnification side relative to the intermediate imaging position MI, and a relay optical system O1 is arranged on the reduction side relative to the intermediate imaging position MI. An optical element P is arranged on the reduction side relative to the relay optical system O1.

In example 1, the magnification optical system Op includes a first lens element L1 to a 15th lens element L15, including a surface 1 to a surface 30 (for surface numbers, see numerical examples described later.

In example 1, the relay optical system O1 includes a first lens group G1 to a sixth lens group G6. The first lens group G1 has a positive power, and is constituted of a 16th lens element L16, including a surface 31 and a surface 32. The second lens group G2 has a negative power, and is constituted of a 17th lens element L17, including a surface 33 and a surface 34. The third lens group G3 has a positive power, and is constituted of includes an 18th lens element L18, including a surface 35 and a surface 36. The fourth lens group G4 has a positive power, and is constituted of a 19th lens element L19 to a 21st lens element L21, including a surface 37 to a surface 42. The fifth lens group G5 has a negative power, and is constituted of a 22nd lens element L22 and a 23rd lens element L23, including a surface 43 to a surface 47. The sixth lens group G6 has a positive power, and is constituted of a 24th lens element L24 to a 28th lens element L28, including a surface 48 to a surface 57. The optical element P includes a surface 58 and a surface 59.

In examples 2 to 5, the magnification optical system Op is constituted of a first lens element L1 to a 14th lens element L14, including a surface 1 to a surface 28.

In examples 2 to 5, the relay optical system O1 includes a first lens group G1 to a sixth lens group G6. The first lens group G1 has a positive power, and is constituted of the 15th lens element L15, including a surface 29 and a surface 30. The second lens group G2 has a negative power, and is constituted of a 16th lens element L16, including surface 31 and a surface 32. The third lens group G3 has a positive power, and is constituted of a 17th lens element L17, including a surface 33 and a surface 34. The fourth lens group G4 has a positive power, and is constituted of a 18th lens element L18 to a 20th lens element L20, including a surface 35 to a surface 40. The fifth lens group G5 bas a negative power, and is constituted of a 21st lens element L21 and a 22nd lens element L22, including a surface 41 to a surface 45. The sixth lens group G6 has a positive power, and is constituted of a 23rd lens element L23 to a 27th lens element L27, including a surface 46 to a surface 55. The optical element P includes a surface 56 to a surface 61.

The polygonal line arrows shown in lower part of each FIGS. 2A, 7A, 12A, 17A, and 22A includes straight lines obtained by connecting the positions of the first lens group G1 to the sixth lens group G6 corresponding to each of the states of the wide angle end, the intermediate position, and the telephoto end ranked in order from the top in the drawings. The wide angle end and the intermediate position, and the intermediate position and the telephoto end are simply connected by a straight line, which is different from the actual movement of each of the lens groups G1 to G6. The symbols (+) and (−) attached to the reference numerals of the respecting lens groups G1 to G6 indicate the positive or negative power of each of the lens groups G1 to G6.

The zoom lens systems according to examples 1 to 5 may include, as necessary, a focus lens group that performs focus adjustment when an object distance is changed, and a field curvature correction lens group that corrects field curvature aberration after the focus lens group performs focus adjustment. By way of example, the zoom lens system according to example 1 includes a first focus lens group FG1 constituted of the 12th lens element L12 to the 15th lens element L15 and a second focus lens group FG2 constituted of the 16th lens element L16. The zoom lens systems according to examples 2 to 5 include a first focus lens group FG1 constituted of the 11th lens element L11 to the 14th lens element L14 and a second focus lens group FG2 constituted of the 15th lens element L15, respectively. The first focus lens group FG1 and the second focus lens group FG2 are independently movable along the optical axis during focusing.

In each of the drawing, an imaging position on the magnification side (i.e., the magnification conjugate point) is positioned on the left side, and an imaging position on the reduction side (i.e., the reduction conjugate point) is positioned on the right side. In each of the drawing, a straight line drawn closest to the reduction side represents a position of the original image S, and the optical element P is positioned on the magnification side of the original image S. The optical element P represents different optical elements, such as a prism for color separation and color synthesis, an optical filter, a flat-parallel glass plate, a crystal low-pass filter, and an infrared cut filter.

In the zoom lens system according to example 1, there are a plurality of air intervals among the first lens element L1 to the 28th lens element L28 and the optical element P. In the zoom lens system according to each of examples 2 to 5, there are a plurality of air intervals among the first lens element L1 to the 27th lens element L27 and the optical element P. The magnification optical system Op has the longest air interval along the optical axis in the magnification optical system. For example, in example 1, as shown in FIG. 2A, the longest air interval exists between the 11th lens element L11 and the 12th lens element L12. In examples 2 to 5, as shown in FIGS. 7A, 12A, 17A, and 22A, the longest air interval exists between the 10th lens element L10 and the 11th lens element L11. The magnification optical system Op includes a front group Opf positioned on the magnification side with respect to the longest air interval and a rear group Opr positioned on the reduction side with respect to the longest air interval. The front group Opf and the rear group Opr may have a single lens element or a plurality of lens elements.

FIGS. 3A-3C, 8A-8C, 13A-13C, 18A-18C, and 23A-23C are longitudinal aberration diagrams of the zoom lens systems according to examples 1 to 5 for an object distance of 1100 mm. FIGS. 4A-4B, 9A-9B, 14A-14B, 19A-19B, and 24A-24B are longitudinal aberration diagrams of the zoom lens systems according to examples 1 to 5 for object distances of 710 mm and 762 mm. FIGS. 5A-5B, 10A-10B, 15A-15B, 20A-20B, and 25A-25B are longitudinal aberration diagrams of the zoom lens systems according to examples 1 to 5 for object distances of 2842 mm and 3048 mm. FIGS. 3A, 8A, 13A, 18A, and 23A show longitudinal aberration diagrams at the wide angle end of the zoom lens system, FIGS. 3B, 8B, 13B, 18B, and 23B show longitudinal aberration diagrams at the intermediate position, and FIGS. 3C, 8C, 13C, 18C, and 23C show longitudinal aberration diagrams at the telephoto end.

Each of the longitudinal aberration diagrams shows spherical aberration (SA (mm)), astigmatism (AST (mm)), and distortion (DIS (%)) in order from the left side. In the spherical aberration diagram, the vertical axis represents a pupil height, the solid line represents the characteristic of the d-line, the short dashed line represents the characteristic of the F-line, and the long dashed line represents the characteristic of the C-line. In the astigmatism diagram, the vertical axis represents an image height, and the solid line represents the characteristic of the sagittal plans (denoted by s in the drawing), and the dashed line represents characteristic of the meridional plane (denoted by m in the drawing). In the distortion diagram, the vertical axis represents the image height. The distortion aberration represents a distortion with respect to equidistant projection.

Example 1

As shown in FIGS. 1 and 2, the zoom lens system according to example 1 includes the magnification optical system Op and the relay optical system O1. The magnification optical system Op is constituted of the first lens element L1 to the 15th lens element L15. The magnification optical system Op is constituted of the front group Opf and the rear group Opr.

The front group Opf of the magnification optical system Op is constituted of the first lens element L1 to the 11th lens element L11 in order from the magnification side to the reduction side. The first lens element L1 has a negative meniscus shape with the convex surface facing the magnification side. The second lens element L2 has a negative meniscus shape with the convex surface facing the magnification side. The third lens element L3 has a negative meniscus shape with the convex surface facing the magnification side. The fourth lens element L4 has a biconcave shape. The fifth lens element L5 has a biconvex shape. The sixth lens element L6 has a positive meniscus shape with the convex surface facing the reduction side. The seventh lens element L7 has a positive meniscus shape with the convex surface facing the reduction side. The eighth lens element L8 has a biconcave shape. The ninth lens element L9 has a positive meniscus shape with the convex surface facing the reduction side. The 10th lens element L10 has a biconvex shape. The 11th lens element L11 has a negative meniscus shape with the convex surface facing the magnification side.

The rear group Opr of the magnification optical system Op is constituted of the 12th lens element L12 to the 15th lens element L15 in order from the magnification side to the reduction side. The 12th lens element L12 has a biconvex shape. The 13th lens element L13 has a positive meniscus shape with the convex surface facing the magnification side. The 14th lens element L14 has a positive meniscus shape with the convex surface facing the magnification side. The 15th lens element L15 bas a negative meniscus shape with the convex surface facing the magnification side.

The relay optical system O1 is constituted of the 16th lens element L16 to the 28th lens element L28 in order from the magnification side to the reduction side. The 16th lens element L16 has a negative meniscus shape with the convex surface facing the reduction side. The 17th lens element L17 has a biconcave shape. The 18th lens element L18 has a positive meniscus shape with the convex surface facing the reduction side. The 19th lens element L19 has a biconvex shape. The 20th lens element L20 has a negative meniscus shape with the convex surface facing the reduction side. The 21st lens element L21 has a biconvex shape. The 22nd lens element L22 has a positive meniscus shape with the convex surface facing the magnification side. The 23rd lens element L23 has a negative meniscus shape with the convex surface facing the magnification side. The 24th lens element L24 has a biconcave shape. The 25th lens element L25 has a biconvex shape. The 26th lens element L26 has a biconvex shape. The 27th lens element L27 has a negative meniscus shape with the convex surface facing the magnification side. The 28th lens element L28 has a biconvex shape.

The relay optical system O1 is constituted of, in order from the magnification side to the reduction side, the first lens group G1 (L16) having a positive power, the second lens group G2 (L17) having a negative power, the third lens group G3 (L18) having a positive power, the fourth lens group G4 (L19 to L21) having a positive power, the fifth lens group G5 (L22 and L23) having a negative power, and the sixth lens group G6 (L24 to L28) having a positive power. During zooming, the magnification optical system Op and the sixth lens group G6 are fixed with respect to the reduction conjugate point. The first lens group G1 to the fifth lens group G5 may be independently displaced along the optical axis, or at least one lens group of the first lens group G1 to the fifth lens group G5 may be fixed with respect to the reduction conjugate point.

The intermediate imaging position MI is positioned between the 15th lens element L15 and the 16th lens element L16. An aperture A is arranged between the 22nd lens element L22 and the 23rd lens element L23. The optical element P having zero optical power is arranged on the reduction side of the relay optical system O1.

Examples 2 to 5

As shown in FIGS. 6, 7A-7C, 11, 12A-12C, 16, 17A-17C, 21; and 22A-22C, the zoom lens system according to each of examples 2 to 5 includes the magnification optical system Op and the relay optical system O1. The magnification optical system Op is constituted of the first lens element L1 to the 14th lens element L14. The magnification optical system Op includes the front group Opf and the rear group Opr.

The front group Opf of the magnification optical system Op is constituted of the first lens element L1 to the 10th lens element L10 in order from the magnification side to the reduction side. The first lens element L1 has a negative meniscus shape with the convex surface facing the magnification side. The second lens element L2 has a negative meniscus shape with the convex surface facing the magnification side. The third lens element L3 has a negative meniscus shape with the convex surface facing the magnification side. The fourth lens element L4 has a biconcave shape. The fifth lens element L5 has a biconvex shape. The sixth lens element L6 has a positive meniscus shape with the convex surface facing the reduction side. The seventh lens element L7 has a positive meniscus shape with the convex surface facing the reduction side. The eighth lens element L8 has a biconcave shape. The ninth lens element L9 has a biconvex shape. The 10th lens element L10 has a biconvex shape.

The rear group Opr of the magnification optical system Op is constituted of the 11th lens element L11 to the 14th lens element L14 in order from the magnification side to the reduction side. The 11th lens element L11 has a biconvex shape. The 12th lens element L12 has a positive meniscus shape with the convex surface facing the magnification side. The 13th lens element L13 has a positive meniscus shape with the convex surface facing the magnification side. The 14th lens element L14 has a negative meniscus shape with the convex surface facing the magnification side.

The relay optical system O1 is constituted of the 15th lens element L15 to the 27th lens element L27 in order from the magnification side to the reduction side. The 15th lens element L15 has a positive meniscus shape with convex surface facing the reduction side. The 16th lens element L16 has a biconcave shape. The 17th lens element L17 has a positive meniscus shape with the convex surface facing the reduction side. The 18th Lens element L18 has a biconvex shape. The 19th lens element L19 has a negative meniscus shape with the convex surface facing the reduction side. The 20th lens element L20 has a biconvex shape. The 21st lens element L21 has a positive meniscus shape with the convex surface facing the magnification side. The 22nd lens element L22 has a negative meniscus shape with the convex surface facing the magnification side. The 23rd lens element L23 has a biconcave shape. The 24th lens element L24 has a biconvex shape. The 25th lens element L25 has a biconvex shape. The 26th lens element L26 has a negative meniscus shape with the convex surface facing the magnification side. The 27th lens element L27 has a biconvex shape.

The relay optical system O1 is constituted of, in order from the magnification side to the reduction side, the first lens group G1 (L15) having a positive power, the second lens group G2 (L16) having a negative power, the third lens group G3 (L17) having a positive power, the fourth lens group G4 (L18 to L20) having a positive power, the fifth lens group G5 (L21 and L22) having a negative power, and the sixth lens group G6 (L23 to L27) having a positive power. During zooming, the magnification optical system Op and the sixth lens group G6 are fixed with respect to the reduction conjugate point. The first lens group G1 to the fifth lens group G5 may be independently displaced along the optical axis, or at least one lens group of the first lens group G1 to the fifth lens group G5 may be fixed with respect to the reduction conjugate point.

The intermediate imaging position MI is positioned between the 14th lens element L14 and the 15th lens element L15. An aperture is arranged between the 21st lens element L21 and the 22nd lens element L22. The optical element P having zero optical power is arranged on the reduction side of the relay optical system O1.

The zoom lens system according to each of examples 1 to 5 may include not only a lens element having an optical power but also an element having zero or substantially zero optical power, such as mirror, diaphragm, mask, cover glass, filter, prism, wave plate, and polarizing element.

Next, conditions which the zoom lens system according to each of examples 1 to 5 can satisfy are described below. Although a plurality of the conditions are defined for the zoom lens system according to each of the examples, all of these plurality of conditions may be satisfied, or the individual conditions may be satisfied to obtain the corresponding effects.

The zoom lens system according to each of examples 1 to 5 is an optical system internally having an intermediate imaging position that is conjugate with both of a magnification conjugate point on a magnification side and a reduction conjugate point on a reduction side. The optical system includes: a magnification optical system including a plurality of lens elements and positioned on the magnification side with respect to the intermediate imaging position; and a relay optical system including a plurality of lens elements and positioned on the reduction side with respect to the intermediate imaging position. The magnification optical system is fixed with respect to the reduction conjugate point during zooming. The relay optical system includes a plurality of moving lens groups which are independently movable in an optical axis direction during zooming, wherein the reduction side-closest moving lens group that is positioned closest to the reduction side among the plurality of moving lens groups has a negative refractive power.

By way of example, in examples 1 to 5, the second lens group G2 to the fifth lens group G5 are independently movable in the optical axis direction during zooming, and the fifth lens group G5 has a negative refractive power.

According to such configuration, even when the lens is made wider in angle, the lens can be made small in effective diameter. Therefore, the weight of the optical system can be reduced, and the weight of the mechanical component can also be reduced.

Further, since the zooming operation can be performed without moving the magnification optical system that tends to increase in size and weight, the zoom mechanism can be reduced in size and weight.

Further, the configuration in which the reduction side-closest moving lens group among the plurality of moving lens groups has a negative refractive power enables the amount of movement during zooming to be reduced, and the effective diameter of the lens to be also reduced, and therefore reduction in size is achieved. Further, field curvature and astigmatism generated by the intermediate imaging configuration can be corrected by the moving lens group having the negative refractive power, thereby high performance can be achieved.

In the zoom lens system according to each of examples 1 to 5, the reduction side-closest moving lens group may move to the reduction side during zooming from the wide angle end to the telephoto end.

By way of example, in examples 1 to 5, the fifth lens group G5 moves to the reduction side during zooming from the wide angle end to the telephoto end.

According to such configuration, aberration fluctuation can be reduced during zooming, and good performance can be obtained over the entire zoom region.

Further, the zoom lens system according to each of examples 1 to 5 may satisfy the following condition (1):

$$0.01 < CIN/Y\text{max} < 1.0 \tag{1}$$

where CIN is a movement amount of the reduction side-closest moving lens group during zooming, and Ymax is an effective image circle diameter on the reduction side.

The condition (1) is a conditional expression for defining the relationship between the movement amount of the reduction side-closest side moving lens group and the effective image circle diameter on the reduction side. When satisfying the condition (1), it is possible to achieve a lens system reduced in size but having a wide angle. If falling below the lower limit of the condition (1), the movement amount of the reduction side-closest moving lens group becomes too small, and it becomes difficult to correct the field curvature and the astigmatism. On the other hand, if exceeding the upper limit of the condition (1), the movement amount of the reduction side-closest moving lens group increases, the overall lens length increases, and reduction in size becomes difficult.

In addition to the condition (1), more advantageous effects can be obtained by further satisfying the following condition (1A):

$$0.02 < CIN/Y\text{max} < 0.90 \tag{1A}$$

In the zoom lens system according to each of examples 1 to 5, the relay optical system may include a reduction side-closest fixed lens group that is fixed with respect to the reduction conjugate point during zooming and positioned closest to the reduction side, and the reduction side-closest fixed lens group may have a positive refractive power.

By way of example, in examples 1 to 5, the sixth lens group G6 having a positive refractive power may be fixed with respect to the reduction conjugate point during zooming.

According to such configuration, since the reduction side-closest fixed lens group has a positive refractive power, aberration fluctuation during zooming can be reduced while telecentricity is maintained.

In the zoom lens system according to each of examples 1 to 5, the relay optical system may include a magnification side-closest fixed lens group that is fixed with respect to the reduction conjugate point during zooming and positioned closest to the magnification side.

By way of example, in examples 1 to 5, the first lens group G1 may be fixed with respect to the reduction conjugate point during zooming.

According to such configuration, aberration fluctuation occurring during zooming can be reduced. The mechanism design of the zoom lens system becomes simplified.

In the zoom lens system according to each of examples 1 to 5, the plurality of moving lens groups may include at least four moving lens groups that move between the reduction side-closest fixed lens group and the magnification side-closest fixed lens group during zooming from the wide angle end to the telephoto end.

By way of example, in examples 1 to 5, the second lens group G2 to the fifth lens group G5 may move between the sixth lens group G6 and the first lens group G1 during zooming from the wide angle end to the telephoto end.

According to such configuration, the number of variator lens groups that contribute to the focal length fluctuation of the entire zoom lens system increases, and therefore the movement amount of each of the moving lens groups can be reduced. Therefore, since aberration fluctuation occurring during zooming is also kept small, the movement amount of a compensator lens group that moves for correcting the aberration fluctuation can be also reduced, and the zoom lens system can be reduced in size. Aberration fluctuation occurring during zooming can be corrected well, and high performance can be achieved.

In the zoom lens system according to each of examples 1 to 5, the magnification optical system may include a first focus lens group that is movable along the optical axis during focusing, and the relay optical system may include a second focus lens group that is movable along the optical axis during focusing.

According to such configuration, the occurrence amount of field curvature aberration during focusing is reduced, and good image quality can be obtained. Further, since the mechanism components for positioning each focus lens group are dispersed, the center of gravity of the lens barrel can be brought closer to the reduction side.

The zoom lens system according to each of examples 1 to 5 may satisfy the following condition (2):

$$10 < fN/fw < 5000 \tag{2}$$

where fN is a focal length of the reduction side-closest moving lens group, and fw is a focal length of the entire optical system at the wide angle end.

The condition (2) is a conditional expression for defining the relationship between the focal length of the reduction side-closest moving lens group and the focal point of the entire optical system at the wide angle end. When satisfying the condition (2), it is possible to achieve a lens system having a small lens diameter but having a wide angle. If falling below the lower limit of the condition (2), the effective diameter of the reduction side-closest moving lens group becomes large and heavy. On the other hand, if exceeding the upper limit of the condition (2), the power of the reduction side-closest moving lens group becomes too weak, and the field curvature cannot be appropriately corrected.

In addition to the condition (2), more advantageous effects can be obtained by further satisfying the following condition (2A):

$$100 < fN/fw < 4500 \tag{2A}$$

The zoom lens system according to each of examples 1 to 5 may satisfy the following condition (3):

$$3.0 < T \max \times f2/fw^2 < 16.0 \tag{3}$$

where f2 is a focal Length of the magnification optical system, and fw is a focal length of the entire optical system at the wide angle end.

The condition (3) is a conditional expression for defining the relationship among the effective image circle diameter on the reduction side, the focal length of the magnification optical system, and the focal length of the entire optical system at the wide angle end. When satisfying the condition (3), it is possible to achieve downsizing and high performance. If falling below the lower limit of the condition (3), the effective image circle diameter with respect to the focal length of the entire optical system becomes too small, the power of the magnification optical system with respect to the focal length of the entire optical system becomes too strong, and therefore the balance of correcting spherical aberration and astigmatism together with the magnification side optical system becomes poor, thereby making it difficult to achieve high performance. On the other hand, if exceeding the upper limit of the condition (3), the effective image circle diameter with respect to the focal length of the entire optical system becomes too large, the power of the magnification optical system with respect to the focal length of the entire optical system becomes weak, and reduction in size of the entire optical system becomes difficult.

In addition to the condition (3), more advantageous effects can be obtained by further satisfying the following condition (3A):

$$4.0 < Y \max \times f2/fw^2 < 15.0 \tag{3A}$$

The zoom lens system according to each of examples 1 to 5 may satisfy the following condition (4):

$$0.02 < enP/TL1 < 0.35 \tag{4}$$

where enP is a distance on the optical axis from the magnification side closest surface of the magnification optical system to an entrance pupil position in a case where the magnification side is an entrance side, and TL1 is a distance on the optical axis from the reduction side-closest surface to the magnification side-closest surface of the magnification optical system.

The condition (4) is a conditional expression for defining a ratio between a distance on the optical axis from the magnification side-closest surface of the magnification optical system to an entrance pupil position in a case where the magnification side is an entrance side and the entire lens length of the magnification optical system. In a normal optical system where an intermediate image is not formed, it is necessary to secure a long back focus. In the present embodiment, on the other hand, an intermediate image is formed once, and a long back focus is secured by the relay optical system. This enables the entrance pupil position to be brought to the magnification side as compared with the normal optical system, and wide angle can be achieved while the lens diameter closest to the magnification side of the magnification optical system is reduced. If falling below the lower limit of the condition (4), the entire lens length of the magnification optical system Increases, and the lens diameter closest to the magnification side increases. On the other hand, if exceeding the upper limit of the condition (4), the entrance pupil position approaches the reduction side, and it becomes difficult to secure a desired angle of view.

In addition to the condition (4), more advantageous effects can be obtained by further satisfying the following condition (4A):

$$0.05 < enP/TL1 < 0.30 \tag{4A}$$

The zoom lens system according to each of examples 1 to 5 may satisfy the following condition (5):

$$2.0 < fN1/fw < 25.0 \tag{5}$$

where fN1 is a focal length of the negative lens element positioned closest to the magnification side among the plurality of lens elements constituting the reduction side-closest moving lens group, and fw is a focal length of the entire optical system at the wide angle end.

The condition (5) is a conditional expression for defining the relationship between the focal length of the negative lens element positioned closest to the magnification side among the plurality of lens elements constituting the reduction side-closest moving lens group and the focal point of the entire optical system at the wide angle end. When satisfying the condition (5), it is possible to secure refractive power of the negative lens element, which becomes advantageous for correction of astigmatism, and to contribute to reduction in the number of lenses constituting the reduction side closest moving lens group. If falling below the lower limit of the condition (5), the refractive power of the negative lens element becomes too strong, and correction becomes excessive. As a result, the number of positive lenses arranged on the reduction side relative to the negative lens element increases. On the other hand, if exceeding the upper limit of the condition (5), the refractive power of the negative lens element cannot be secured, and astigmatism correction becomes insufficient.

In addition to the condition (5), more advantageous effects can be obtained by further satisfying the following condition (5A):

$$3.0 < fN1/fW < 24.0 \quad (5A)$$

The zoom lens system according to each of examples 1 to 5 may satisfy the following condition (6):

$$-27.0 < fP1/fw < -4.0 \quad (6)$$

where fP1 is a focal length of the positive lens element positioned closest to the magnification side among the plurality of lens elements constituting the reduction side-closest moving lens group, and fw is a focal length of the entire optical system at the wide angle end.

The condition (6) is a conditional expression for defining the relationship between the focal length of the positive lens element positioned closest to the magnification side among the plurality of lens elements constituting the reduction side-closest moving lens group and the focal point of the entire optical system at the wide angle end. When satisfying the condition (6), it is possible to secure the refractive power of the positive lens element, which becomes advantageous for correction of astigmatism, and to contribute to reduction the number of lenses constituting the reduction side-closest moving lens group. If falling below the lower limit of the condition (6), the refractive power of the positive lens element becomes too strong, and correction becomes excessive. As a result, the number of negative lenses arranged on the reduction side relative to the positive Jens element increases. On the other hand, if exceeding the upper limit of the condition (6), the refractive power of the positive lens element cannot be secured, and astigmatism correction becomes insufficient.

In addition to the condition (6), more advantageous effects can be obtained by further satisfying the following condition (6A):

$$-26.0 < fP1/fw < -5.0 \quad (6A)$$

As described above, some examples have been described to exemplify the technology disclosed in the present application. The technology of the present disclosure, however, is not limited only to these examples, but also can be applied to other embodiments appropriately devised through modification, substitution, addition, omission and so on.

Hereinafter, numerical examples of the zoom lens system according to examples 1 to 5 are described. In each of the numerical examples, in the table, the unit of length is all "mm", and the unit of angle of view is all "°" (degree). Further, in each of the numerical examples, r is a radius of curvature, d is a surface interval, nd is a refractive index for d line, and vd is an Abbe number for d line. Further, in each of the numerical examples, a surface marked with "*" is aspherical, and the aspherical shape is defined by the following formula.

$$Z = \frac{h^2/r}{1 + \sqrt{1 - (1+\kappa)(h/r)^2}} + \sum A_n h^n \quad \text{[Mathematical Formula 1]}$$

where Z is a distance from a point located on an aspherical surface at a height "h" from the optical axis, to the tangent plane of the aspherical vertex, h is a height from the optical axis, r is a radius of curvature of the vertex, x is a cone constant, and An is a nth-order aspherical coefficient.

Numerical Example 1

Regarding the zoom lens system of numerical example 1 (corresponding to example 1), Table 1 shows surface data, Table 2 shows various data, Table 3 shows focus data and Table 4 shows single lens data (unit: mm).

TABLE 1

Surface data

| SURFACE NUMBER | r | d | nd | vd |
|---|---|---|---|---|
| Object plane | 1100 | | | |
| 1* | 119.52640 | 9.95790 | 1.50940 | 56.5 |
| 2* | 35.26070 | 22.38460 | | |
| 3 | 80.77750 | 3.54460 | 1.72916 | 54.7 |
| 4 | 36.63530 | 9.48700 | | |
| 5 | 62.52070 | 2.50000 | 1.83480 | 42.7 |
| 6 | 27.67310 | 21.99700 | | |
| 7 | −70.15910 | 8.21900 | 1.80420 | 46.5 |
| 8 | 594.69480 | 1.33940 | | |
| 9 | 124.64020 | 5.54800 | 1.80420 | 46.5 |
| 10 | −72.62130 | 12.49590 | | |
| 11* | −26.31610 | 9.31280 | 1.51633 | 64.1 |
| 12* | −19.60190 | 0.20000 | | |
| 13 | −98.60780 | 7.09890 | 1.49700 | 81.6 |
| 14 | −26.03630 | 1.62820 | | |
| 15 | −30.52300 | 2.50000 | 1.86966 | 20.0 |
| 16 | 462.48500 | 1.18290 | | |
| 17 | −1029.08340 | 11.21670 | 1.49700 | 81.6 |
| 18 | −32.78000 | 5.06020 | | |
| 19 | 97.10520 | 10.58070 | 1.49700 | 81.6 |
| 20 | −116.90860 | 0.20000 | | |
| 21 | 1514.53830 | 2.50000 | 1.69895 | 30.0 |
| 22 | 112.81290 | 44.43170 | | |
| 23 | 182.05880 | 11.70470 | 1.92286 | 20.9 |
| 24 | −210.37220 | 0.20000 | | |
| 25 | 48.61070 | 8.96200 | 1.92286 | 20.9 |
| 26 | 62.66610 | 0.20000 | | |
| 27 | 45.19540 | 9.36130 | 1.92286 | 20.9 |
| 28 | 56.62650 | 8.71460 | | |
| 29 | 231.84200 | 3.49290 | 1.80420 | 46.5 |
| 30 | 53.15190 | 31.13120 | | |
| 31 | −42.19710 | 11.00000 | 1.92286 | 20.9 |
| 32 | −44.81820 | variable | | |
| 33 | −66.03250 | 10.98810 | 1.73800 | 32.3 |
| 34 | 105.97070 | variable | | |
| 35 | −195.89250 | 9.96520 | 1.86966 | 20.0 |
| 36 | −51.81730 | variable | | |
| 37 | 787.21310 | 15.00000 | 1.59282 | 68.6 |
| 38 | −62.23670 | 4.30150 | | |
| 39 | −64.03190 | 2.00000 | 1.59270 | 35.3 |
| 40 | −221.32210 | 0.20000 | | |
| 41 | 170.84870 | 4.64260 | 1.49700 | 81.6 |
| 42 | −170.84870 | variable | | |
| 43 | 39.46460 | 5.47980 | 1.59270 | 35.3 |
| 44 | 100.39760 | 3.09940 | | |
| 45 (Aperture) | ∞ (infinity) | 5.22890 | | |
| 46 | 79.89460 | 1.50000 | 1.51633 | 64.1 |
| 47 | 29.25490 | variable | | |
| 48 | −47.20730 | 1.50000 | 1.73800 | 32.3 |
| 49 | 75.86060 | 2.98340 | | |
| 50 | 261.00240 | 5.81550 | 1.43700 | 95.1 |

TABLE 1-continued

Surface data

| SURFACE NUMBER | r | d | nd | vd |
|---|---|---|---|---|
| 51 | −50.05640 | 1.00000 | | |
| 52 | 70.71160 | 8.65750 | 1.49700 | 81.6 |
| 53 | −91.07290 | 7.74240 | | |
| 54 | 54.14990 | 2.50000 | 1.67300 | 38.3 |
| 55 | 39.07210 | 3.06530 | | |
| 56 | 44.60940 | 20.61510 | 1.43700 | 95.1 |
| 57 | −65.26060 | 15.56000 | | |
| 58 | ∞ | 41.77900 | 1.51680 | 64.2 |
| 59 | ∞ | BF | | |
| Image plane | ∞ | | | |

Aspherical Data

1st Surface

K=0.00000E+00, A3=3.39820E−05, A4=−1.51102E−07, A5=−4.58997E−0.8, A6=1.59795E−09, A7=−1.70289E−11, A8=−4.83390E−14, A9=2.30699E−15, A10=−1.29896E−17

2nd Surface

K=−7.96856E−01, A3=7.17508E−05, A4=−4.26012E−06, A5=3.28783E−09, A6=8.82707E−11, A7=−4.41750E−14, A8=3.60550E−14, A9=3.79852E−16, A10=−1.13853E−17

11th Surface

K=0.0000E+00, A3=0.00000E+00, A4=−2.02960E−05, A5=0.00000E+00, A6=−3.69442E−08, A7=0.00000E+00, A8=−1.54744E−10, A9=0.00000E+00, A10=−9.62371E−13

12th Surface

K=0.00000E+00, A3=0.00000E+00, A4=4.14867E−06, A5=0.00000E+00, A6=6.06723E−09, A7>0.00000E+00, A8=−2.46057E−12, A9=0.00000E+00, A10=0.00000E+00

TABLE 2

Various data
Zoom ratio 1.06933

| | WIDE-ANGLE | INTERMEDIATE | TELEPHOTO |
|---|---|---|---|
| Focal length | −7.2198 | −7.4490 | −7.7203 |
| F number | −2.02590 | −2.00781 | −1.98875 |
| Angle of view | −66.9980 | −66.3120 | −65.5018 |
| Image height | 17.2650 | 17.2650 | 17.2650 |
| Total length of lens | 566.0109 | 566.0160 | 566.0230 |
| BF | 1.01142 | 1.01655 | 1.02348 |
| d32 | 5.4491 | 4.6995 | 3.7601 |
| d34 | 9.3254 | 9.6493 | 10.0398 |
| d36 | 76.8535 | 74.2970 | 71.5047 |
| d42 | 2.0076 | 6.2752 | 10.9585 |
| d47 | 19.5880 | 18.3026 | 16.9605 |
| Position of entrance pupil | 41.6882 | 41.7026 | 41.7217 |
| Position of exit pupil | −1054.2466 | −786.0529 | −618.7915 |
| Position of front principal point | 34.4190 | 34.1831 | 33.9052 |
| Position of rear principal point | 573.1850 | 573.4164 | 573.6911 |

TABLE 3

Focus data

| | WIDE-ANGLE | TELEPHOTO |
|---|---|---|
| Object distance | 710 | 762 |
| d22 | 45.1039 | 44.9532 |
| d30 | 32.6985 | 32.3698 |
| d32 | 3.2095 | 2.0000 |
| Object distance | 2842 | 3048 |
| d22 | 43.5563 | 43.6180 |
| d30 | 29.1661 | 29.1908 |
| d32 | 8.2896 | 6.5141 |

TABLE 4

Single lens data

| Lens element | First surface | Focal length |
|---|---|---|
| 1 | 1 | −102.2638 |
| 2 | 3 | −95.1642 |
| 3 | 5 | −61.4805 |
| 4 | 7 | −77.6073 |
| 5 | 9 | 57.7824 |
| 6 | 11 | 101.0651 |
| 7 | 13 | 68.9431 |
| 8 | 15 | −32.8471 |
| 9 | 17 | 67.8725 |
| 10 | 19 | 108.5127 |
| 11 | 21 | −174.5214 |
| 12 | 23 | 107.2908 |
| 13 | 25 | 179.8190 |
| 14 | 27 | 174.1513 |
| 15 | 29 | −86.5064 |
| 16 | 31 | 770.9116 |
| 17 | 33 | −53.6694 |
| 18 | 35 | 78.4874 |
| 19 | 37 | 97.9353 |
| 20 | 39 | −152.7368 |
| 21 | 41 | 172.6598 |
| 22 | 43 | 106.1564 |
| 23 | 46 | −90.3026 |
| 24 | 48 | −39.2268 |
| 25 | 50 | 96.6619 |
| 26 | 52 | 81.5406 |
| 27 | 54 | −223.4034 |
| 28 | 56 | 64.3031 |

Numerical Example 2

Regarding the zoom lens system of numerical example 2 (corresponding to example 2), Table 5 shows surface data, Table 6 shows various data, Table 7 shows focus data and Table 8 shows single lens data (unit: mm).

TABLE 5

Surface data

| SURFACE NUMBER | r | d | nd | vd |
|---|---|---|---|---|
| Object plane | ∞ (infinity) | | | |
| 1* | 108.57490 | 9.86090 | 1.50940 | 56.5 |
| 2* | 34.69390 | 20.30690 | | |
| 3 | 70.39560 | 3.50000 | 1.72916 | 54.7 |
| 4 | 38.31030 | 11.49800 | | |
| 5 | 77.82800 | 2.55000 | 1.83480 | 42.7 |
| 6 | 27.71270 | 17.45220 | | |
| 7 | −96.08890 | 14.26620 | 1.80420 | 46.5 |
| 8 | 599.95490 | 1.50490 | | |
| 9 | 177.60990 | 4.95400 | 1.80420 | 46.5 |
| 10 | −97.56240 | 16.45290 | | |
| 11* | −26.06720 | 10.00000 | 1.51623 | 64.0 |
| 12* | −19.77710 | 0.50000 | | |

TABLE 5-continued

Surface data

| SURFACE NUMBER | r | d | nd | vd |
|---|---|---|---|---|
| 13 | −173.26010 | 8.24160 | 1.49700 | 81.6 |
| 14 | −25.51300 | 1.54570 | | |
| 15 | −29.60210 | 2.50000 | 1.86966 | 20.0 |
| 16 | 293.57420 | 0.52810 | | |
| 17 | 279.39620 | 12.50000 | 1.49700 | 81.6 |
| 18 | −34.34210 | 0.20000 | | |
| 19 | 198.85500 | 4.73030 | 1.49700 | 81.6 |
| 20 | −349.39300 | 53.33020 | | |
| 21 | 179.39700 | 11.00000 | 1.92286 | 20.9 |
| 22 | −211.73330 | 0.20000 | | |
| 23 | 46.44700 | 8.12660 | 1.92286 | 20.9 |
| 24 | 60.48990 | 0.20000 | | |
| 25 | 41.56800 | 7.73270 | 1.92286 | 20.9 |
| 26 | 53.12620 | 8.05590 | | |
| 27 | 207.23960 | 2.65000 | 1.80420 | 46.5 |
| 28 | 49.42710 | 30.55280 | | |
| 29 | −41.36010 | 11.00000 | 1.92286 | 20.9 |
| 30 | −44.00000 | variable | | |
| 31 | −71.99170 | 11.00000 | 1.73800 | 32.3 |
| 32 | 101.16590 | variable | | |
| 33 | −147.84390 | 9.32680 | 1.86966 | 20.0 |
| 34 | −50.31900 | variable | | |
| 35 | 404.68540 | 15.00000 | 1.59282 | 68.6 |
| 36 | −67.50700 | 6.02000 | | |
| 37 | −69.53260 | 2.00000 | 1.59270 | 35.3 |
| 38 | −346.15300 | 0.20000 | | |
| 39 | 163.62110 | 5.05600 | 1.49700 | 81.6 |
| 40 | −163.62110 | variable | | |
| 41 | 41.34420 | 5.16410 | 1.59270 | 35.3 |
| 42 | 88.81710 | 4.33650 | | |
| 43 (Aperture) | ∞ | 8.00930 | | |
| 44 | 63.11000 | 1.50000 | 1.51633 | 64.1 |
| 45 | 28.89910 | variable | | |
| 46 | −47.00530 | 1.50000 | 1.73800 | 32.3 |
| 47 | 73.83990 | 3.01040 | | |
| 48 | 262.71120 | 5.84800 | 1.43700 | 95.1 |
| 49 | −48.24770 | 1.00000 | | |
| 50 | 67.92220 | 8.30000 | 1.49700 | 81.6 |
| 51 | −98.52820 | 9.50160 | | |
| 52 | 55.63230 | 2.50000 | 1.67300 | 38.3 |
| 53 | 39.87300 | 3.18750 | | |
| 54 | 46.17920 | 18.61040 | 1.43700 | 95.1 |
| 55 | −63.10060 | 7.96480 | | |
| 56 | ∞ | 39.32900 | 1.51680 | 64.2 |
| 57 | ∞ | 4.59520 | | |
| 58 | ∞ | 0.55000 | 1.51680 | 64.2 |
| 59 | ∞ | 4.00000 | | |
| 60 | ∞ | 1.90000 | 1.51680 | 64.2 |
| 61 | ∞ | BF | | |
| Image plane | ∞ | | | |

Aspherical Data

1st Surface

K=0.00000E+00. A3=3.47339E−05, A4=−6.74283E−07, A5=−3.45951E−08, A6=1.51025E−09, A7=−1.70058E−11, A8=−4.88886E−14, A9=2.32790E−15, A10>1.29625E−17

2nd Surface

K=−8.14220E−01, A3=7.29749E−05, A4=−4.65798E−06, A5=9.07093E−09, A6=1.38885E−10, A7=6.41794E−13, A8=4.24196E−15, A9=3.10765E−16, A10=−7.64882E−18.

11th Surface

K=0.00000E+00, A3=0.00000E+00, A4=−1.89513E−05, A5=0.00000E+00, A6=−3.99376E−08, A7=0.00000E+00, A8=−9.35343E−11, A9=0.00000E+00, A10=−1.63883E−12

12th Surface

K=0.00000E+00, A3=0.00000E+00, A4=3.93978E−06, A5=0.00000E+00, A6=4.49592E−09, A7=0.00000E+00, A8=1.93270E−11, A9=0.00000E+00, A10=0.00000E+00

TABLE 6

Various data
Zoom ratio 1.06914

| | WIDE-ANGLE | INTERMEDIATE | TELEPHOTO |
|---|---|---|---|
| Focal length | −7.2248 | −7.4532 | −7.7243 |
| F number | −1.99360 | −1.97285 | −1.95415 |
| Angle of view | −66.9370 | −66.2428 | −65.4271 |
| Image height | 17.2650 | 17.2650 | 17.2650 |
| Total length of lens | 566.0144 | 566.0211 | 566.0304 |
| BF | 0.01470 | 0.02136 | 0.03046 |
| d30 | 5.0844 | 4.4044 | 3.5601 |
| d32 | 11.7317 | 12.0947 | 12.5117 |
| d34 | 74.6222 | 71.8659 | 68.8635 |
| d40 | 2.0995 | 6.5681 | 11.2409 |
| d45 | 17.1124 | 15.7171 | 14.4742 |
| Position of entrance pupil | 42.4243 | 42.4414 | 42.4616 |
| Position of exit pupil | −1175.4441 | −835.9941 | −662.5318 |
| Position of front principal point | 35.1551 | 34.9217 | 34.6472 |
| Position of rear principal point | 573.1935 | 573.4256 | 573.7024 |

TABLE 7

Focus data

| | WIDE-ANGLE | TELEPHOTO |
|---|---|---|
| Object distance | 710 | 762 |
| d20 | 53.9423 | 53.8172 |
| d28 | 31.9015 | 31.6260 |
| d30 | 3.1236 | 2.0000 |
| Object distance | 2842 | 3048 |
| d20 | 52.5571 | 52.5382 |
| d28 | 28.8490 | 28.8074 |
| d30 | 7.5613 | 6.0976 |

TABLE 8

Single lens data

| Lens element | First surface | Focal length |
|---|---|---|
| 1 | 1 | 104.8116 |
| 2 | 3 | −120.8324 |
| 3 | 5 | −52.7756 |
| 4 | 7 | −102.0570 |
| 5 | 9 | 78.9371 |
| 6 | 11 | 103.0090 |
| 7 | 13 | 59.1041 |
| 8 | 15 | −30.8099 |
| 9 | 17 | 62.3604 |
| 10 | 19 | 255.7204 |
| 11 | 21 | 106.6716 |
| 12 | 23 | 169.6700 |
| 13 | 25 | 156.7144 |
| 14 | 27 | −81.3198 |
| 15 | 29 | 747.1094 |
| 16 | 31 | −55.4956 |
| 17 | 33 | 83.9783 |
| 18 | 35 | 98.7613 |
| 19 | 37 | −147.1997 |
| 20 | 39 | 165.4584 |
| 21 | 41 | 125.4283 |

TABLE 8-continued

Single lens data

| Lens element | First surface | Focal length |
|---|---|---|
| 22 | 44 | −104.8150 |
| 23 | 46 | −38.7141 |
| 24 | 48 | 93.8125 |
| 25 | 50 | 82.2590 |
| 26 | 52 | −223.4047 |
| 27 | 54 | 64.3506 |

Numerical Example 3

Regarding the zoom lens system of numerical example 3 (corresponding to example 3), Table 9 shows surface data, Table 10 shows various data, Table 11 shows focus data and Table 12 shows single lens data (unit: mm).

TABLE 9

Surface data

| SURFACE NUMBER | r | d | nd | vd |
|---|---|---|---|---|
| Object plane | ∞ (infinity) | | | |
| 1* | 107.93940 | 9.71900 | 1.50940 | 56.5 |
| 2* | 34.65080 | 22.17080 | | |
| 3 | 70.54480 | 3.50000 | 1.72916 | 54.7 |
| 4 | 36.30430 | 9.83390 | | |
| 5 | 64.40750 | 2.55000 | 1.83480 | 42.7 |
| 6 | 26.01010 | 18.65060 | | |
| 7 | −103.03750 | 15.00000 | 1.80420 | 46.5 |
| 8 | 600.63130 | 1.75360 | | |
| 9 | 191.47870 | 8.08310 | 1.80420 | 46.5 |
| 10 | −92.44130 | 10.25440 | | |
| 11* | −26.41320 | 9.63150 | 1.51623 | 64.0 |
| 12* | −20.25630 | 0.50000 | | |
| 13 | −332.05910 | 8.32290 | 1.49700 | 81.6 |
| 14 | −26.17580 | 1.53410 | | |
| 15 | −30.65370 | 2.50000 | 1.86966 | 20.0 |
| 16 | 156.28270 | 0.59640 | | |
| 17 | 166.12560 | 12.50000 | 1.49700 | 81.6 |
| 18 | −37.78170 | 0.51590 | | |
| 19 | −289.27290 | 5.09840 | 1.49700 | 81.6 |
| 20 | −77.19990 | 52.02180 | | |
| 21 | 176.86570 | 11.75190 | 1.92286 | 20.9 |
| 22 | −176.73490 | 0.20000 | | |
| 23 | 45.86640 | 6.96520 | 1.92286 | 20.9 |
| 24 | 54.59270 | 0.20000 | | |
| 25 | 39.85740 | 8.12970 | 1.92286 | 20.9 |
| 26 | 49.79640 | 8.83050 | | |
| 27 | 196.86620 | 2.65000 | 1.80420 | 46.5 |
| 28 | 49.83570 | 30.13510 | | |
| 29 | −41.15780 | 11.00000 | 1.92286 | 20.9 |
| 30 | −44.00010 | variable | | |
| 31 | −70.24890 | 11.00000 | 1.73800 | 32.3 |
| 32 | 101.97770 | variable | | |
| 33 | −164.30960 | 9.63540 | 1.86966 | 20.0 |
| 34 | −51.20660 | variable | | |
| 35 | 470.56580 | 15.00000 | 1.59282 | 68.6 |
| 36 | −66.16520 | 6.05460 | | |
| 37 | −66.75820 | 2.00000 | 1.59270 | 35.3 |
| 38 | −284.20420 | 0.88270 | | |
| 39 | 163.19380 | 4.94440 | 1.49700 | 81.6 |
| 40 | −163.19380 | variable | | |
| 41 | 42.57330 | 5.13850 | 1.59270 | 35.3 |
| 42 | 96.61330 | 4.30520 | | |
| 43 (Aperture) | ∞ | 7.96890 | | |
| 44 | 73.76860 | 1.50000 | 1.51633 | 64.1 |
| 45 | 30.53830 | variable | | |
| 46 | −50.64390 | 1.61950 | 1.73800 | 32.3 |
| 47 | 66.54560 | 3.00290 | | |
| 48 | 198.12540 | 5.77670 | 1.43700 | 95.1 |
| 49 | −52.21790 | 1.00000 | | |
| 50 | 61.19620 | 8.62750 | 1.49700 | 81.6 |
| 51 | −107.84400 | 7.97930 | | |
| 52 | 53.01580 | 2.50000 | 1.67300 | 38.3 |
| 53 | 37.67940 | 3.33170 | | |
| 54 | 44.26600 | 18.60070 | 1.43700 | 95.1 |
| 55 | −64.76840 | 7.78060 | | |
| 56 | ∞ | 39.32900 | 1.51680 | 64.2 |
| 57 | ∞ | 4.59520 | | |
| 58 | ∞ | 0.55000 | 1.51680 | 64.2 |
| 59 | ∞ | 4.00000 | | |
| 60 | ∞ | 1.90000 | 1.51680 | 64.2 |
| 61 | ∞ | BF | | |
| Image plane | ∞ | | | |

Aspherical Data

1st Surface

K=0.00000E+00, A3=3.56263E−05, A4=−6.70122E−07, A5=−3.52652E−08, A6=1.52095e−09, A7=−1.70058E−11, A8=−4.88886E−14, A9=2.31926E−15, A10=−1.29625E−17

2nd Surface

K=−8.13160E−01, A3=7.26090E−05, A4=−4.66900E−06, A5=9.07850E−09, A6=−1.40082E−10, A7=6.57697E−13, A8=4.33351E−15, A9=3.07920E−16, A10=−7.76577E−18

11th Surface

K=0.00000E+00, A3=0.00000E+00, A4=−1.74363E−05, A5=0.00000E+00, A6=−3.14611E−08, A7=0.00000E+00, A8=−1.57381E−10, A9=0.00000E+00, A10=−9.46957E−13

12th Surface

K=0.00000E+00, A3=0.00000E+00, A4=3.32932E−06, A5=0.000008+00, A6=4.08635E−09, A7=0.00000E+00, A8=5.86116E−12, A9=0.000008+00, A10=0.00000E+00

TABLE 10

Various data
Zoom ratio 1.06951

| | WIDE-ANGLE | INTERMEDIATE | TELEPHOTO |
|---|---|---|---|
| Focal length | −7.2236 | −7.4534 | −7.7257 |
| F number | −1.90135 | −1.90180 | −1.90205 |
| Angle of view | −66.9335 | −66.2462 | −65.4362 |
| Image height | 17.2650 | 17.2650 | 17.2650 |
| Total length of lens | 566.0121 | 566.0180 | 566.0260 |
| BF | 0.01256 | 0.01845 | 0.02641 |
| d30 | 5.1448 | 4.4529 | 3.5909 |
| d32 | 11.8357 | 12.1416 | 12.5089 |
| d34 | 76.1761 | 73.5020 | 70.5797 |
| d40 | 2.1869 | 6.5524 | 11.2141 |
| d45 | 17.0344 | 15.7291 | 14.4844 |
| Position of entrance pupil | 42.1904 | 42.2072 | 42.2279 |
| Position of exit pupil | −864.5124 | −674.6644 | −556.1917 |
| Position of front principal point | 34.9065 | 34.6714 | 34.3948 |
| Position of rear principal point | 573.1900 | 573.4229 | 573.6995 |

TABLE 11

Focus data

|  | WIDE-ANGLE | TELEPHOTO |
|---|---|---|
| Object distance | 710 | 762 |
| d20 | 52.6205 | 52.5019 |
| d28 | 31.5202 | 31.2460 |
| d30 | 3.1611 | 2.0000 |
| Object distance | 2842 | 3048 |
| d20 | 51.2801 | 51.2468 |
| d28 | 28.4192 | 28.3420 |
| d30 | 7.6025 | 6.1591 |

TABLE 12

Single lens data

| Lens element | First surface | Focal length |
|---|---|---|
| 1 | 1 | −104.8781 |
| 2 | 3 | −107.2001 |
| 3 | 5 | −53.8912 |
| 4 | 7 | −108.3340 |
| 5 | 9 | 78.5189 |
| 6 | 11 | 109.8358 |
| 7 | 13 | 56.6631 |
| 8 | 15 | −29.2857 |
| 9 | 17 | 63.2210 |
| 10 | 19 | 210.1999 |
| 11 | 21 | 97.3420 |
| 12 | 23 | 224.8099 |
| 13 | 25 | 155.3855 |
| 14 | 27 | −83.6458 |
| 15 | 29 | 805.2018 |
| 16 | 31 | −54.8740 |
| 17 | 33 | 82.2785 |
| 18 | 35 | 98.8800 |
| 19 | 37 | −147.7192 |
| 20 | 39 | 165.0097 |
| 21 | 41 | 124.0284 |
| 22 | 44 | −102.1322 |
| 23 | 46 | −38.7401 |
| 24 | 48 | 95.2356 |
| 25 | 50 | 79.9095 |
| 26 | 52 | −207.1220 |
| 27 | 54 | 63.4635 |

Numerical Example 4

Regarding the zoom lens system of numerical example 4 (corresponding to example 4), Table 13 shows surface data, Table 14 shows various data, Table 15 shows focus data and Table 16 shows single lens data (unit: mm).

TABLE 13

Surface data

| SURFACE NUMBER | r | d | nd | vd |
|---|---|---|---|---|
| Object plane | ∞ (infinity) | | | |
| 1* | 107.68690 | 9.72840 | 1.50940 | 56.5 |
| 2* | 34.63220 | 22.56300 | | |
| 3 | 70.87530 | 3.50000 | 1.72916 | 54.7 |
| 4 | 35.90850 | 9.42430 | | |
| 5 | 61.51430 | 2.55000 | 1.83480 | 42.7 |
| 6 | 25.61190 | 19.05470 | | |
| 7 | −100.01630 | 15.00000 | 1.80420 | 46.5 |
| 8 | 596.76870 | 1.75850 | | |
| 9 | 183.25580 | 8.80660 | 1.80420 | 46.5 |
| 10 | −87.61240 | 9.17330 | | |
| 11* | −26.00980 | 9.43520 | 1.51623 | 64.0 |
| 12* | −19.95640 | 0.50000 | | |
| 13 | −313.22350 | 8.27000 | 1.49700 | 81.6 |
| 14 | −26.11540 | 1.54520 | | |
| 15 | −30.50610 | 2.50000 | 1.86966 | 20.0 |
| 16 | 147.36870 | 0.60560 | | |
| 17 | 158.01220 | 12.50000 | 1.49700 | 81.6 |
| 18 | −38.42840 | 1.45500 | | |
| 19 | −239.39850 | 5.30350 | 1.49700 | 81.6 |
| 20 | −71.67790 | 50.79710 | | |
| 21 | 179.86360 | 11.90430 | 1.92286 | 20.9 |
| 22 | −171.06680 | 0.20000 | | |
| 23 | 46.19840 | 6.73480 | 1.92286 | 20.9 |
| 24 | 54.51280 | 0.20000 | | |
| 25 | 39.42810 | 8.23100 | 1.92286 | 20.9 |
| 26 | 49.08880 | 9.05080 | | |
| 27 | 202.31160 | 2.65000 | 1.80420 | 46.5 |
| 28 | 50.13730 | 29.90550 | | |
| 29 | −41.18220 | 11.00000 | 1.92286 | 20.9 |
| 30 | −43.99980 | variable | | |
| 31 | −70.59810 | 11.00000 | 1.73800 | 32.3 |
| 32 | 102.80640 | variable | | |
| 33 | −166.30630 | 9.68500 | 1.86966 | 20.0 |
| 34 | −51.33890 | variable | | |
| 35 | 536.30660 | 15.00000 | 1.59282 | 68.6 |
| 36 | −65.36960 | 5.98980 | | |
| 37 | −65.39400 | 2.00000 | 1.59270 | 35.3 |
| 38 | −258.05550 | 0.20000 | | |
| 39 | 162.66690 | 4.95550 | 1.49700 | 81.6 |
| 40 | −162.66690 | variable | | |
| 41 | 42.92380 | 5.13840 | 1.59270 | 35.3 |
| 42 | 99.34020 | 4.28940 | | |
| 43 (Aperture) | ∞ | 7.96240 | | |
| 44 | 76.74060 | 1.50000 | 1.51633 | 64.1 |
| 45 | 30.90790 | variable | | |
| 46 | −51.99450 | 1.56220 | 1.73800 | 32.3 |
| 47 | 64.15710 | 3.01630 | | |
| 48 | 184.92230 | 5.77070 | 1.43700 | 95.1 |
| 49 | −53.29550 | 1.00000 | | |
| 50 | 59.83760 | 9.02330 | 1.49700 | 81.6 |
| 51 | −110.87170 | 7.34660 | | |
| 52 | 52.97550 | 2.50000 | 1.67300 | 38.3 |
| 53 | 37.47270 | 3.41830 | | |
| 54 | 44.44110 | 18.69280 | 1.43700 | 95.1 |
| 55 | −63.58260 | 7.72480 | | |
| 56 | ∞ | 39.32900 | 1.51680 | 64.2 |
| 57 | ∞ | 4.59520 | | |
| 58 | ∞ | 0.55000 | 1.51680 | 64.2 |
| 59 | ∞ | 4.00000 | | |
| 60 | ∞ | 1.90000 | 1.51680 | 64.2 |
| 61 | ∞ | BF | | |
| Image plane | ∞ | | | |

Aspherical Data

1st Surface
K=0.00000E+00, A3=3.51052E−05, A4=−6.50035E−07, A5=−3.56593E−08, A6=1.52395E−09, A7=−1.70058E−11, A8=−4.88886E−14, A9=2.31822E−15, A10=−1.29625E−17

2nd Surface
K=−8.13070E−01, A3=7.28199E−05, A4=−4.67421E−06, A5=9.05250E−09, A6=1.40447E−10, A7=6.64689E−13, A8=4.39462E−15, A9=3.07470E−16, A10=−7.80113E−18

11th Surface
K=0.00000E+00, A3=0.00000E+00, A4=−1.78833E−05, A5=0.00000E+00, A6=−3.25591E−08, A7=0.00000E+00, A8=−1.60452E−10, A9=0.00000E+00, A10=−1.00596E−12

12th Surface
K=0.00000E+00, A3=0.00000E+00, A4=3.42081E−06, A5=0.00000E+00, A6=−4.30100E−09, A7=0.00000E+00, A8=5.56065E−12, A9=0.00000E+00, A10=0.00000E+00

TABLE 14

Various data
Zoom ratio 1.06970

|  | WIDE-ANGLE | INTERMEDIATE | TELEPHOTO |
|---|---|---|---|
| Focal length | −7.2233 | −7.4539 | −7.7268 |
| F number | −1.90140 | −1.90182 | −1.90208 |
| Angle of view | −66.9245 | −66.2381 | −65.4290 |
| Image height | 17.2650 | 17.2650 | 17.2650 |
| Total length of lens | 566.0117 | 566.0180 | 566.0259 |
| BF | 0.01217 | 0.01841 | 0.02622 |
| d30 | 5.1360 | 4.4478 | 3.5907 |
| d32 | 11.8825 | 12.1640 | 12.5093 |
| d34 | 77.2499 | 74.6008 | 71.6985 |
| d40 | 2.3360 | 6.5824 | 11.1561 |
| d45 | 16.8986 | 15.7081 | 14.5486 |
| Position of entrance pupil | 42.1910 | 42.2068 | 42.2266 |
| Position of exit pupil | −832.9840 | −667.5316 | −557.8821 |
| Position of front principal point | 34.9050 | 34.6697 | 34.3928 |
| Position of rear principal point | 573.1893 | 573.4232 | 573.7005 |

TABLE 15

Focus data

|  | WIDE-ANGLE | TELEPHOTO |
|---|---|---|
| Object distance | 710 | 762 |
| d20 | 51.3988 | 51.2764 |
| d28 | 31.3005 | 31.0169 |
| d30 | 3.1394 | 2.0000 |
| Object distance | 2842 | 3048 |
| d20 | 50.0521 | 50.0205 |
| d28 | 28.1784 | 28.1050 |
| d30 | 7.6082 | 6.1678 |

TABLE 16

Single lens data

| Lens element | First surface | Focal length |
|---|---|---|
| 1 | 1 | −104.9319 |
| 2 | 3 | −104.2179 |
| 3 | 5 | −54.3222 |
| 4 | 7 | −105.5037 |
| 5 | 9 | 74.7898 |
| 6 | 11 | 108.5158 |
| 7 | 13 | 56.7830 |
| 8 | 15 | −28.8733 |
| 9 | 17 | 63.5376 |
| 10 | 19 | 203.7187 |
| 11 | 21 | 96.5786 |
| 12 | 23 | 236.3368 |
| 13 | 25 | 154.0846 |
| 14 | 27 | −83.5337 |
| 15 | 29 | 797.5899 |
| 16 | 31 | −55.2272 |
| 17 | 33 | 82.1745 |
| 18 | 35 | 99.2085 |
| 19 | 37 | −148.3547 |
| 20 | 39 | 164.4815 |
| 21 | 41 | 123.3406 |

TABLE 16-continued

Single lens data

| Lens element | First surface | Focal length |
|---|---|---|
| 22 | 44 | −101.3582 |
| 23 | 46 | −38.6943 |
| 24 | 48 | 95.3750 |
| 25 | 50 | 79.5926 |
| 26 | 52 | −203.4666 |
| 27 | 54 | 63.1828 |

Numerical Example 5

Regarding the zoom lens system of numerical example 5 (corresponding to example 5), Table 17 shows surface data, Table 18 shows various data, Table 19 shows focus data and Table 20 shows single lens data (unit: mm).

TABLE 17

Surface data

| SURFACE NUMBER | r | d | nd | vd |
|---|---|---|---|---|
| Object plane | ∞ (infinity) | | | |
| 1* | 107.32640 | 9.75330 | 1.50940 | 56.5 |
| 2* | 34.58550 | 23.06690 | | |
| 3 | 69.97420 | 3.50000 | 1.72916 | 54.7 |
| 4 | 35.39210 | 8.83770 | | |
| 5 | 57.65260 | 2.55000 | 1.83480 | 42.7 |
| 6 | 24.74670 | 19.92290 | | |
| 7 | −95.31400 | 15.00000 | 1.80420 | 46.5 |
| 8 | 600.03660 | 1.76880 | | |
| 9 | 167.20170 | 8.80910 | 1.80420 | 46.5 |
| 10 | −79.62250 | 7.70610 | | |
| 11* | −25.27710 | 8.86040 | 1.51623 | 64.0 |
| 12* | −19.44370 | 0.50000 | | |
| 13 | −277.44070 | 8.24600 | 1.49700 | 81.6 |
| 14 | −25.73980 | 1.59330 | | |
| 15 | −29.69170 | 2.50000 | 1.86966 | 20.0 |
| 16 | 140.52190 | 0.62760 | | |
| 17 | 153.63470 | 12.50000 | 1.49700 | 81.6 |
| 18 | −38.56630 | 3.16940 | | |
| 19 | −224.30250 | 5.59290 | 1.49700 | 81.6 |
| 20 | −69.32340 | 48.07180 | | |
| 21 | 179.14340 | 12.25130 | 1.92286 | 20.9 |
| 22 | −166.72040 | 0.20000 | | |
| 23 | 45.77820 | 6.54020 | 1.92286 | 20.9 |
| 24 | 52.98250 | 0.20000 | | |
| 25 | 39.29160 | 8.37000 | 1.92286 | 20.9 |
| 26 | 48.97510 | 9.27850 | | |
| 27 | 216.19300 | 2.65000 | 1.80420 | 46.5 |
| 28 | 49.97070 | 29.69320 | | |
| 29 | −41.21940 | 11.00000 | 1.92286 | 20.9 |
| 30 | −44.00000 | variable | | |
| 31 | −71.26720 | 11.00000 | 1.73800 | 32.3 |
| 32 | 105.87870 | variable | | |
| 33 | −167.81610 | 9.77280 | 1.86966 | 20.0 |
| 34 | −51.55790 | variable | | |
| 35 | 836.00430 | 15.00000 | 1.59282 | 68.6 |
| 36 | −63.14680 | 5.33560 | | |
| 37 | −62.56920 | 2.00000 | 1.59270 | 35.3 |
| 38 | −211.81410 | 0.20000 | | |
| 39 | 162.85640 | 4.95760 | 1.49700 | 81.6 |
| 40 | −162.85640 | variable | | |
| 41 | 43.51190 | 5.14970 | 1.59270 | 35.3 |
| 42 | 104.62450 | 4.23080 | | |
| 43 (Aperture) | ∞ | 7.93870 | | |
| 44 | 84.96510 | 1.50000 | 1.51633 | 64.1 |
| 45 | 31.64870 | variable | | |
| 46 | −54.36570 | 1.50000 | 1.73800 | 32.3 |
| 47 | 61.44020 | 3.01920 | | |
| 48 | 168.76060 | 5.74410 | 1.43700 | 95.1 |
| 49 | −54.77350 | 1.00000 | | |

TABLE 17-continued

Surface data

| SURFACE NUMBER | r | d | nd | vd |
|---|---|---|---|---|
| 50 | 57.79820 | 10.37250 | 1.49700 | 81.6 |
| 51 | −117.01690 | 6.21800 | | |
| 52 | 53.09390 | 2.50000 | 1.67300 | 38.3 |
| 53 | 37.13360 | 3.53330 | | |
| 54 | 44.55600 | 18.79630 | 1.43700 | 95.1 |
| 55 | −62.12050 | 7.72480 | | |
| 56 | ∞ | 39.32900 | 1.51680 | 64.2 |
| 57 | ∞ | 4.59520 | | |
| 58 | ∞ | 0.55000 | 1.51680 | 64.2 |
| 59 | ∞ | 4.00000 | | |
| 60 | ∞ | 1.90000 | 1.51680 | 64.2 |
| 61 | ∞ | BF | | |
| Image plane | ∞ | | | |

1st Surface

K=0.00000E+00, A3=3.50560E−05, A4=−6.26647E−07, A5=−3.64379E−08, A6=1.53157E−09, A7=−1.70058E−11, A8=−4.88886E−14, A9=2.31486E−15, A10=−1.29625E−17

2nd Surface

K=−8.13220E−01, A3=7.38627E−05, A4=−4.69123E−06, A5=8.97173E−09, A6=1.30980E−10, A7=6.82314E−13, A8=4.57316E−15, A9=3.06921E−16, A10=−7.86124E−18

11th Surface

K=0.00000E+00, A3=0.00000E+00, A4=−1.86266E−05, A5=0.00000E+00, A6=−3.61032E−08, A7=0.00000E+00, A8=−1.69497E−10, A9=0.00000E+00, A10=−1.12305E−12

12th Surface

K=0.00000E+00, A3=0.00000E+00, A4=3.39082E−06, A5=0.00000E+00, A6=−4.78562E−09, A7=0.00000E+00, A8=2.25262E−13, A9=0.00000E+00, A10=0.00000E+00

TABLE 18

Various data
Zoom ratio 1.07012

| | WIDE-ANGLE | INTERMEDIATE | TELEPHOTO |
|---|---|---|---|
| Focal length | −7.2231 | −7.4551 | −7.7296 |
| F number | −1.90135 | −1.90174 | −1.90199 |
| Angle of view | −66.8497 | −66.1697 | −65.3689 |
| Image height | 17.2650 | 17.2650 | 17.2650 |
| Total length of lens | 566.0135 | 566.0191 | 566.0261 |
| BF | 0.01384 | 0.01943 | 0.02646 |
| Zoom ratio | 5.1454 | 4.4626 | 3.6196 |
| d32 | 11.9931 | 12.2230 | 12.5159 |
| d34 | 79.0173 | 76.4053 | 73.5350 |
| d40 | 2.5217 | 6.6430 | 11.0569 |
| d45 | 16.6952 | 15.6388 | 14.6452 |
| Position of entrance pupil | 42.1403 | 42.1550 | 42.1730 |
| Position of exit pupil | −818.7031 | −672.7451 | −574.9864 |
| Position of front principal point | 34.8534 | 34.6172 | 34.3395 |
| Position of rear principal point | 573.1910 | 573.4256 | 573.7034 |

TABLE 19

Focus data

| | WIDE-ANGLE | TELEPHOTO |
|---|---|---|
| Object distance | 710 | 762 |
| d20 | 48.6847 | 48.5577 |
| d28 | 31.1231 | 30.8269 |
| d30 | 3.1026 | 2.0000 |
| Object distance | 2842 | 3048 |
| d20 | 47.3093 | 47.2784 |
| d28 | 27.9146 | 27.8423 |
| d30 | 7.6865 | 6.2639 |

TABLE 20

Single lens data

| Lens element | First surface | Focal length |
|---|---|---|
| 1 | 1 | −104.9241 |
| 2 | 3 | −102.5916 |
| 3 | 5 | 53.8354 |
| 4 | 7 | −101.3005 |
| 5 | 9 | 68.1538 |
| 6 | 11 | 107.5759 |
| 7 | 13 | 56.4727 |
| 8 | 15 | −27.9948 |
| 9 | 17 | 63.3968 |
| 10 | 19 | 199.4869 |
| 11 | 21 | 95.1909 |
| 12 | 23 | 254.0972 |
| 13 | 25 | 152.1946 |
| 14 | 27 | −81.3958 |
| 15 | 29 | 786.4931 |
| 16 | 31 | −56.2352 |
| 17 | 33 | 82.3563 |
| 18 | 35 | 99.6567 |
| 19 | 37 | −150.5745 |
| 20 | 39 | 164.6725 |
| 21 | 41 | 121.8612 |
| 22 | 44 | −98.6254 |
| 23 | 46 | −38.8695 |
| 24 | 48 | 95.3723 |
| 25 | 50 | 79.4091 |
| 26 | 52 | −195.8940 |
| 27 | 54 | 62.7347 |

Table 21 below shows values of the variables of the respective conditions (1) to (6) in the respective numerical examples.

TABLE 21

| Cond. | Ex. 1 | Ex. 2 | Ex. 3 | Ex. 4 | Ex. 5 |
|---|---|---|---|---|---|
| (1) | 0.076 | 0.076 | 0.074 | 0.068 | 0.059 |
| (2) | 2864.3 | 3111.3 | 748.4 | 675.8 | 405.1 |
| (3) | 7.981 | 7.571 | 7.590 | 7.592 | 7.625 |
| (4) | 0.177 | 0.181 | 0.181 | 0.181 | 0.182 |
| (5) | 12.508 | 14.508 | 14.139 | 14.032 | 13.654 |
| (6) | −14.704 | −17.361 | −17.170 | −17.075 | −16.871 |

Table 22 below shows values of the variables of the respective conditions (1) to (6) in the respective numerical examples:

| Var. | Ex. 1 | Ex. 2 | Ex. 3 | Ex. 4 | Ex. 5 |
| --- | --- | --- | --- | --- | --- |
| CTN | 2.62749 | 2.63827 | 2.55 | 2.35 | 2.05 |
| Ymax | 34.53000 | 34.53000 | 34.53000 | 34.53000 | 34.53000 |
| fN | −20679.55188 | −22478.40021 | −5406.23086 | −4881.53719 | −2926.02913 |
| fw | −7.21979 | −7.22480 | −7.22360 | −7.22330 | −7.22310 |
| f2 | 12.0 | 11.4 | 11.5 | 11.5 | 11.5 |
| enP | 41.6882 | 42.4243 | 42.1904 | 42.19 | 42.14 |
| TL1 | 236.021 | 234.387 | 233.46 | 233.44 | 232.07 |
| fN1 | −90.3026 | −104.8150 | −102.1322 | −101.3582 | −98.6254 |
| fP1 | 106.16 | 125.43 | 124.03 | 123.34 | 121.86 |

Note:
CTN is a movement amount of the reduction side-closest moving lens group during zooming,
Ymax is an effective image circle diameter on the reduction side,
fN is a focal length of the reduction side-closest moving lens group,
fw is a focal length of the entire optical system at the wide angle end,
f2 is a focal length of the magnification optical system,
enP is a distance on the optical axis from the magnification side-closest surface of the magnification optical system to an entrance pupil position in a case where the magnification side is an entrance side,
TL1 is a distance on the optical axis from the reduction side-closest surface to the magnification side-closest surface of the magnification optical system,
fN1 is a focal length of the negative lens element positioned closest to the magnification side among the plurality of lens elements constituting the reduction side-closest moving lens group, and
fP1 is a focal length of the positive lens element positioned closest to the magnification side among the plurality of lens elements constituting the reduction side-closest moving lens group.

Second Embodiment

Figure 26:
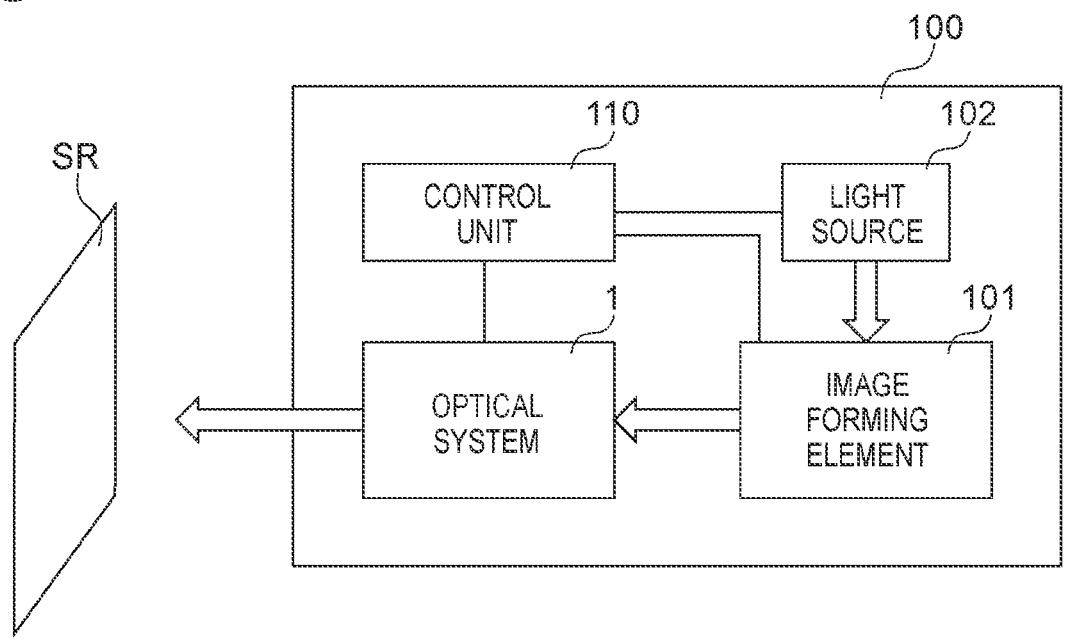
FIG. 26 is a block diagram showing an example of an image projection apparatus according to the present disclosure.

Hereinafter, a second embodiment of the present disclosure is described with reference to FIG. 26. FIG. 26 is a block diagram showing an example of the image projection apparatus according to the present disclosure. The image projection apparatus 100 includes such an optical system 1 as disclosed in the first embodiment, an image forming element 101, a light source 102, a control unit 110, and others. The image forming element 101 is constituted of, for example, liquid crystal or DMD, for generating an image to be projected through the optical system 1 onto a screen SR. The Light source 102 is constituted of such as a light emitting diode (LED) or a laser, and supplies light to the image forming element 101. The control unit 110 is constituted of, for example, central processing unit (CPU) or micro-processing unit (MPU), for controlling the entire apparatus and respective components. The optical system 1 may be configured as an interchangeable lens that can be detachably attached to the image projection apparatus 100. In this case, an apparatus in which the optical system 1 is removed from the image projection apparatus 100 is an example of a main body apparatus.

The image projection apparatus 100 described above can realize a wide-angle zoom function while achieving reduction in size and weight of the apparatus by employing the optical system 1 according to the first embodiment.

Third Embodiment

Figure 27:
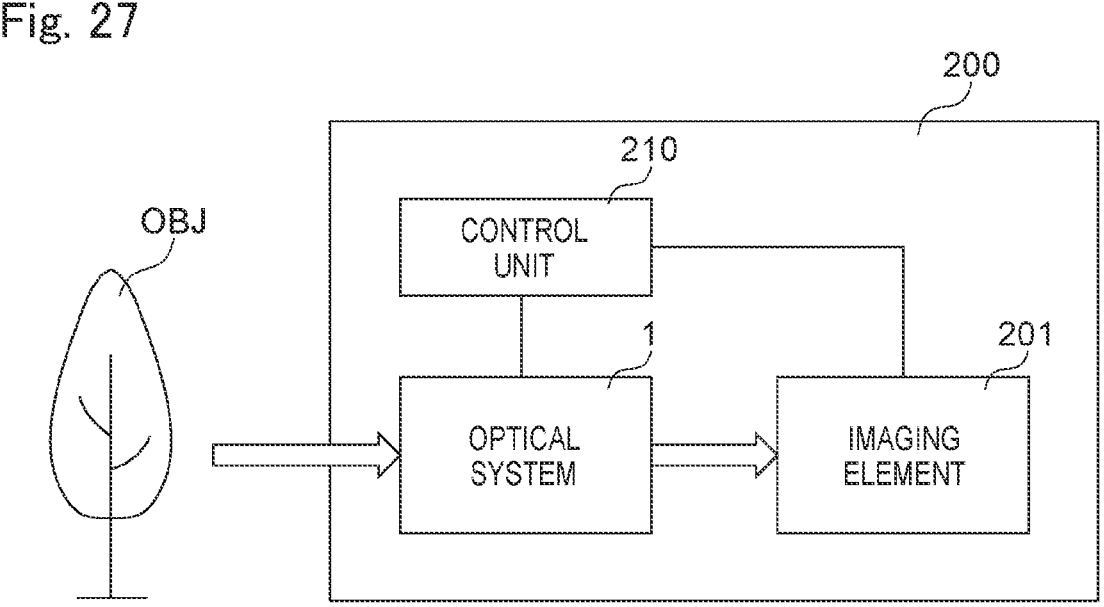
FIG. 27 is a block diagram showing an example of an imaging apparatus according to the present disclosure.

Hereinafter, a third embodiment of the present disclosure is described with reference to FIG. 27. FIG. 27 is a block diagram showing an example of the imaging apparatus according to the present disclosure. The imaging apparatus 200 includes such an optical system 1 as disclosed in the first embodiment, an imaging element 201, a control unit 210, and others. The imaging element 201 is constituted of, for example, charge coupled device (CCD) image sensor or complementary metal oxide semiconductor (CMOS) image sensor, for receiving an optical image of an object OBJ formed by the optical system 1 to convert the image into an electrical image signal. The control unit 110 is constituted of, for example, CPD or MPU, for controlling the entire apparatus and respective components. The optical system 1 may be configured as an interchangeable lens that can be detachably attached to the imaging apparatus 200. In this case, an apparatus in which the optical system 1 is removed from the imaging apparatus 200 is an example of a main body apparatus.

The imaging apparatus 200 described above can realize a wide-angle zoom function while achieving reduction in size and weight of the apparatus by employing the optical system 1 according to the first embodiment.

As described above, the embodiments have been described to disclose the technology in the present disclosure. To that end, the accompanying drawings and detailed description are provided.

Therefore, among the components described in the accompanying drawings and the detailed description, not only the components that are essential for solving the problem, but also the components that are not essential for solving the problem may also be included in order to exemplify the above-described technology. Therefore, it should not be directly appreciated that the above non-essential components are essential based on the fact that the non-essential components are described in the accompanying drawings and the detailed description.

Further, the above-described embodiments have been described to exemplify the technology in the present disclosure. Thus, various modification, substitution, addition, omission and so on can be made within the scope of the claims or equivalents thereof.

INDUSTRIAL APPLICABILITY

The present disclosure can be applied to image projection apparatuses such as projectors and head-up displays, and imaging apparatuses such as digital still cameras, digital video cameras, surveillance cameras in surveillance systems, web cameras, and onboard cameras. In particular, the present disclosure can be applied to optical systems that require a high image quality, such as projectors, digital still camera systems, and digital video camera systems.

The invention claimed is:

1. An optical system internally having an intermediate imaging position that is conjugate with both of a magnification conjugate point on a magnification side and reduction conjugate point on a reduction side, the optical system comprising:

a magnification optical system including a plurality of lens elements and positioned on the magnification side with respect to the intermediate imaging position; and a relay optical system including a plurality of lens elements and positioned on the reduction side with respect to the intermediate imaging position, wherein the magnification optical system is fixed with respect to the reduction conjugate point during zooming, and wherein the relay optical system includes a plurality of moving lens groups which are independently movable in an optical axis direction during zooming, and wherein the reduction side-closest moving lens group that is positioned closest to the reduction side among the plurality of moving lens groups has a negative refractive power, and wherein the optical system satisfies the following condition (3):

$$3.0 < Y\max \times f2/fw^2 < 16.0 \tag{3}$$

where f2 is a focal length of the magnification optical system fw is a focal length of the entire optical system at the wide angle end, and Ymax is an effective image circle diameter on the reduction side.

2. The optical system according to claim 1, wherein the reduction side-closest moving lens group moves to the reduction side during zooming from the wide angle end to the telephoto end.

3. The optical system according to claim 1, satisfying the following condition (1):

$$0.01 < CTN/Y\max < 1.0 \tag{1}$$

where CTN is a movement amount of the reduction side-closest moving lens group during zooming.

4. The optical system according to claim 1, wherein the relay optical system includes a reduction side-closest fixed lens group that is fixed with respect to the reduction conjugate point during zooming and positioned closest to the reduction side, and the reduction side-closest fixed lens group has a positive refractive power.

5. The optical system according to claim 1, wherein the relay optical system includes a magnification side-closest fixed lens group that is fixed with respect to the reduction conjugate point during zooming and positioned closest to the magnification side.

6. The optical system according to claim 5, wherein the plurality of moving lens groups include at least four moving lens groups that move between the reduction side-closest fixed lens group and the magnification side-closest fixed lens group during zooming from the wide angle end to the telephoto end.

7. The optical system according to claim 1, wherein the magnification optical system includes a first focus lens group that is movable along the optical axis during focusing, and the relay optical system includes a second focus lens group that is movable along the optical axis during focusing.

8. The optical system according to claim 1, satisfying the following condition (2):

$$10 < fN/fw < 5000 \tag{2}$$

where fN is a focal Length of the reduction side-closest moving lens group, and fw is a focal length of the entire optical system at the wide angle end.

9. The optical system according to claim 1, satisfying the following condition (4):

$$0.02 < enP/TL1 < 0.35 \tag{4}$$

where enP is a distance on the optical axis from the magnification side-closest surface of the magnification optical system to an entrance pupil position in a case where the magnification side is an entrance side, and TL1 is a distance on the optical axis from the reduction side-closest surface to the magnification side-closest surface of the magnification optical system.

10. The optical system according to claim 1, satisfying the following condition (5):

$$2.0 < fN1/fw < 25.0 \tag{5}$$

where fN1 is a focal length of the negative lens element positioned closest to the magnification side among the plurality of lens elements constituting the reduction side-closest moving lens group, and fw is a focal length of the entire optical system at the wide angle end.

11. The optical system according to claim 1, satisfying the following condition (6):

$$-27.0 < fP1/fw < -4.0 \tag{6}$$

where fP1 is a focal length of the positive lens element positioned closest to the magnification side among the plurality of lens elements constituting the reduction side-closest moving lens group, and fw is a focal length of the entire optical system at the wide angle end.

12. An optical system internally having an intermediate imaging position that conjugate with both of a magnification conjugate point on a magnification side and s reduction conjugate point on a reduction side, the optical system comprising:

a magnification optical system including a plurality of lens elements and positioned on the magnification side with respect to the intermediate imaging position, and a relay optical system including a plurality of lens elements and positioned on the reduction side with respect to the intermediate imaging position, wherein the magnification optical system is fixed with respect to the reduction conjugate point during zooming, and wherein the relay optical system includes a plurality of moving lens groups which are independently movable in an optical axis direction during zooming, and wherein the reduction side-closest moving lens group that is positioned closest to the reduction side among the plurality of moving lens groups has a negative refractive power, and wherein the relay optical system includes a reduction side-closest fixed lens group that is fixed with respect to the reduction conjugate point during zooming and positioned closest to the reduction side, and the reduction side-closest fixed lens group has a positive refractive power, and wherein the relay optical system includes a magnification side-closest fixed lens group that is fixed with respect to the reduction conjugate point during zooming and positioned closest to the magnification side.

13. An optical system internally having an intermediate imaging position that is conjugate with both of a magnification conjugate point on a magnification side and a reduction conjugate point on a reduction side, the optical system comprising:

a magnification optical system including a plurality of lens elements and positioned on the magnification side with respect to the intermediate imaging position; and a relay optical system including a plurality of lens elements and positioned on the reduction side with respect to the intermediate imaging position, wherein the magnification optical system is fixed with respect to the reduction conjugate point during zooming, and wherein the relay optical system includes a plurality of moving lens groups which are independently movable in an optical axis direction during zooming, and wherein the reduction side-closest moving lens group that is positioned closest to the reduction side among the plurality of moving lens groups has a negative refractive power, and wherein the magnification optical system includes a first focus lens group that is movable along the optical axis during focusing, and the relay optical system includes a second focus lens group that is movable along the optical axis during focusing.

14. An image projection apparatus comprising:
the optical system according to claim 1; and
an image forming element that generates an image to be projected through the optical system onto a screen.

15. An imaging apparatus comprising:
the optical system according to claim 1; and
an imaging element that receives an optical image formed by the optical system to convert the optical image into an electrical image signal.

* * * * *